(12) United States Patent
Kamata et al.

(10) Patent No.: US 9,073,452 B2
(45) Date of Patent: *Jul. 7, 2015

(54) LATCH APPARATUS

(75) Inventors: Kiyohiko Kamata, Yokohama (JP); Naoya Seto, Yokohama (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/237,705

(22) PCT Filed: Apr. 4, 2012

(86) PCT No.: PCT/JP2012/059232
§ 371 (c)(1),
(2), (4) Date: Feb. 7, 2014

(87) PCT Pub. No.: WO2013/021680
PCT Pub. Date: Feb. 14, 2013

(65) Prior Publication Data
US 2014/0169874 A1    Jun. 19, 2014

(30) Foreign Application Priority Data
Aug. 8, 2011  (JP) .................. 2011-173385

(51) Int. Cl.
E05C 3/06 (2006.01)
B60N 2/015 (2006.01)
B60N 2/36 (2006.01)
E05C 3/16 (2006.01)

(52) U.S. Cl.
CPC ....... B60N 2/01508 (2013.01); Y10T 403/7188 (2015.01); B60N 2/01516 (2013.01); B60N 2/366 (2013.01)

(58) Field of Classification Search
USPC ......... 292/194, 216, 201, DIG. 23; 296/65.01
See application file for complete search history.

(56) References Cited

U.S. PATENT DOCUMENTS

| 4,759,580 A | * | 7/1988 | Berklich et al. ........... 296/65.03 |
| 4,773,693 A | * | 9/1988 | Premji et al. .............. 296/65.03 |
| 4,875,724 A | * | 10/1989 | Gruber ......................... 292/216 |
| 5,230,544 A | * | 7/1993 | Morritt et al. ............. 296/65.05 |
| 5,522,626 A | * | 6/1996 | Dominique .................. 292/198 |

(Continued)

FOREIGN PATENT DOCUMENTS

CN 101007516 A 8/2007
CN 101228043 A 7/2008

(Continued)

OTHER PUBLICATIONS

International Search Report dated Jul. 17, 2012 issued in connection with International Application No. PCT/JP2012/059232.

(Continued)

*Primary Examiner* — Carlos Lugo
(74) *Attorney, Agent, or Firm* — Foley & Lardner LLP

(57) ABSTRACT

A latch apparatus brings a latch which is accommodated rotationally movably in a case made up of a base plate and a cover plate into engagement with a striker which enters an entrance groove in the case. A fastening member which fastens the case to a mount member so as to move relative to the striker is provided within a range defined by projecting an area which has a radius centering at the striker onto the case, the radius being equal to a distance to an outermost position of the latch which is in engagement with the striker.

15 Claims, 18 Drawing Sheets

(56) References Cited

U.S. PATENT DOCUMENTS

| | | | |
|---|---|---|---|
| 5,730,480 A * | 3/1998 | Takamura | 248/503.1 |
| 6,328,354 B1 * | 12/2001 | Dejean et al. | 292/216 |
| 7,066,500 B2 * | 6/2006 | Haber | 292/106 |
| 7,264,293 B2 * | 9/2007 | Fischer et al. | 296/65.03 |
| 7,926,858 B2 * | 4/2011 | Otsuka | 292/216 |
| 2008/0191535 A1 | 8/2008 | Baumchen et al. | |
| 2011/0175388 A1 | 7/2011 | Paing et al. | |

FOREIGN PATENT DOCUMENTS

| | | | | |
|---|---|---|---|---|
| CN | 101445068 A | | 6/2009 | |
| EP | 125958 A1 | * | 11/1984 | E05B 65/19 |
| GB | 2162234 A | * | 1/1986 | E05C 3/26 |
| JP | 10-324182 | | 12/1998 | |
| JP | 2007-217908 | | 8/2007 | |
| JP | 4591375 B2 | | 12/2010 | |
| JP | 2011000951 A | * | 1/2011 | |
| JP | 2011-038292 | | 2/2011 | |

OTHER PUBLICATIONS

First Office Action dated Dec. 3, 2014 issued in connection with Chinese Application No. 201280038809.2, with English translation.

* cited by examiner

LATCH APPARATUS

CROSS REFERENCE TO RELATED APPLICATIONS

The present application is a U.S. National Stage of International Application No. PCT/JP2012/059232 filed on Apr. 4, 2012, which claims the benefit of Japanese Patent Application No. 2011-173385 filed on Aug. 8, 2011. The entire disclosures of which are incorporated herein by reference.

TECHNICAL FIELD

The present invention relates to a latch apparatus for use in fixing a detachable seat or a movable seat.

BACKGROUND ART

One box cars and the like are designed not only to accommodate occupants but also to load cargo, so that an average number of seats and a cargo space are provided. Additionally, in many cases, seats other than a driver's seat and a front passenger's seat are made up of detachable seats or movable seats. Then, when there is much cargo to be loaded in the vehicle, the detachable seat or seats are detached or the movable seat or seats are moved to ensure a loading space for the cargo.

In the case of the detachable seat or the movable seat, a hinge hole is provided in an end of a rail which supports the seat, while a latch is attached to the other end of the rail. Then, one end portion of the rail is mounted so that a hinge shaft which is provided on a surface of a floor is rotatably supported in the hinge hole, whereby the detachable seat or the movable seat can be rotationally moved around the hinge shaft. On the other hand, with the detachable seat or the movable seat allowed to rotationally move around the hinge shaft, the latch attached to the other end of the rail is brought into engagement with a striker which is provided on the floor surface, whereby the detachable seat or the movable seat can be fixed to the floor surface.

Incidentally, when a distance between the hinge shaft and the striker is shorter or longer than a reference distance due to a mounting error of the hinge shaft or the striker or the like, the latch is not allowed to engage with the striker, and therefore, the detachable seat or the movable seat cannot be fixed to the floor surface.

CITATION LIST

Patent Literature

To eliminate these situations, a latch apparatus is proposed in which a case is extended to an area above a rotational area of a latch to configure a mounting portion, and a round hole (a mounting hole) is provided in the center of the mounting portion, while arc-shaped elongated holes (mounting holes) which are centered at the round hole are provided on both sides of the round hole. According to this latch apparatus, even when the distance between a hinge shaft and a striker is shorter or longer due to a mounting error of the hinge shaft or the striker, the latch is allowed to engage with the striker by the latch apparatus rotationally moving around the round hole, whereby the detachable seat or the movable seat can be fixed to the floor surface (for example, refer to Patent Literature 1).

PTL 1: JP-A-10-324182

SUMMARY OF THE INVENTION

Technical Problem

However, since the case is extended to the area above the rotational area of the latch to configure the mounting portion, the latch apparatus is enlarged as a whole. Additionally, since the round hole and the elongated holes are provided in positions spaced away from the striker which is in an engagement state, in the event that a large force is applied to the latch via the striker, there is a possibility that the case is turned up.

The invention has been made in view of the situations, and an object thereof is to provide a latch apparatus which is small in size as a whole and in which a case is not turned up even though a large force is exerted on a latch via a striker.

Solution to Problem

In order to solve the above-described problems and to achieve the above objects, one aspect of the invention provides a latch apparatus comprising: a case which is mounted on a mount member and in which an entrance groove which a striker enters is formed; and a latch, which is accommodated in the case so as to be rotationally movable, and which is configured to be brought into engagement with the striker which enters the entrance groove, wherein the latch apparatus comprises a fastening member configured to fasten the case to the mount member such that the case is moveable relative to the striker within a range defined by projecting an area, which has a radius centering at the striker being in engagement with the latch, onto the case, the radius being equal to a length to an outermost position of the latch being in engagement with the striker.

Advantageous Effects of Invention

The latch apparatus according to the invention includes the fastening member which fastens the case to the mount member so as to move relative to the striker within the range defined by projecting the area, which has the radius centering at the striker which is in engagement with the latch, onto the case, the radius being equal to the length to the outermost position of the latch which is in engagement with the striker. Therefore, the latch apparatus is made small in size as a whole, and even though a large force is exerted on the latch via the striker, the case is not turned up.

BRIEF DESCRIPTION OF DRAWINGS

FIG. 3-1 is a conceptual drawing which shows the operation of the latch, the drawing showing a state in which the latch moves to an initial position.

FIG. 3-2 is a conceptual drawing which shows the operation of the latch, the drawing showing a state resulting immediately before the latch receives a striker therein.

FIG. 3-3 is a conceptual drawing which shows the operation of the latch, the drawing showing a state in which the latch moves to an engagement position.

FIG. 3-4 is a conceptual drawing which shows the operation of the latch, the drawing showing a state in which the latch moves to an opening position.

FIG. 4-1 is a drawing which shows a state in which the latch moves to the initial position with the striker lying further forwards than a reference position.

FIG. 4-2 is a drawing which shows a state resulting immediately before the latch receives the striker therein with the striker lying further forwards than the reference position.

FIG. 4-3 is a drawing which shows a state in which the latch moves to the engagement position with the striker lying further forwards than the reference position.

FIG. 4-4 is a drawing which shows a state in which the latch moves to the opening position with the striker lying further forwards than the reference position.

FIG. 5-1 is a drawing which shows a state in which the latch moves to the initial position with the striker lying further rearwards than the reference position.

FIG. 5-2 is a drawing which shows a state resulting immediately before the latch receives the striker therein with the striker lying further rearwards than the reference position.

FIG. 5-3 is a drawing which shows a state in which the latch moves to the engagement position with the striker lying further rearwards than the reference position.

FIG. 5-4 is a drawing which shows a state in which the latch moves to the opening position with the striker lying further rearwards than the reference position.

FIG. 13-1 is a conceptual drawing which shows the operation of the latch, the drawing showing a state in which the latch moves to an initial position.

FIG. 13-2 is a conceptual drawing which shows the operation of the latch, the drawing showing a state resulting immediately before the latch receives a striker therein.

FIG. 13-3 is a conceptual drawing which shows the operation of the latch, the drawing showing a state in which the latch moves to an engagement position.

FIG. 13-4 is a conceptual drawing which shows the operation of the latch, the drawing showing a state in which the latch moves to an opening position.

FIG. 14-1 is a drawing which shows a state in which the latch moves to the initial position with the striker lying further forwards than the reference position.

FIG. 14-2 is a drawing which shows a state resulting immediately before the latch receives the striker therein with the striker lying further forwards than the reference position.

FIG. 14-3 is a drawing which shows a state in which the latch moves to the engagement position with the striker lying further forwards than the reference position.

FIG. 14-4 is a drawing which shows a state in which the latch moves to the opening position with the striker lying further forwards than the reference position.

FIG. 15-1 is a drawing which shows a state in which the latch moves to the initial position with the striker lying further rearwards than the reference position.

FIG. 15-2 is a drawing which shows a state resulting immediately before the latch receives the striker therein with the striker lying further rearwards than the reference position.

FIG. 15-3 is a drawing which shows a state in which the latch moves to the engagement position with the striker lying further rearwards than the reference position.

FIG. 15-4 is a drawing which shows a state in which the latch moves to the opening position with the striker lying further rearwards than the reference position.

FIG. 17-1 is a conceptual drawing which shows the operation of the latch, the drawing showing a state in which a latch moves to an opening position.

FIG. 17-2 is a conceptual drawing which shows the operation of the latch, the drawing showing a state in which the latch moves to an engagement position.

FIG. 17-3 is a conceptual drawing which shows the operation of the latch, the drawing showing a state in which the latch is operated to open entrance grooves.

DESCRIPTION OF EMBODIMENTS

Hereinafter, embodiments of the invention will be described in detail based on the drawings. It is noted that herein, while the invention is described as being applied to a latch apparatus which is used to fix a seat, the invention is not limited by the embodiments.

Embodiment 1

Figure 1:
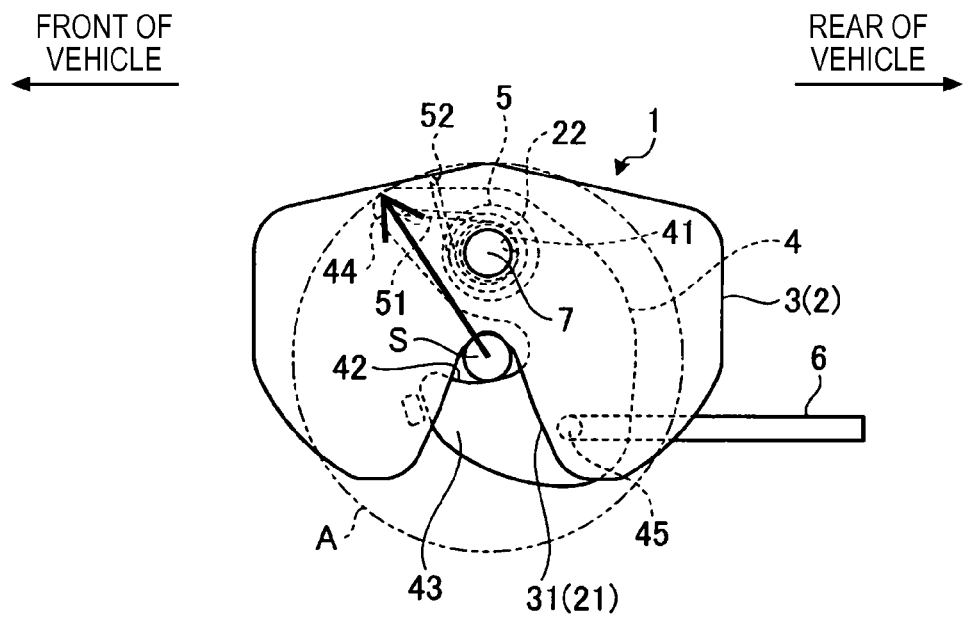
FIG. 1 is a conceptual drawing which shows the configuration of a latch apparatus which configures Embodiment 1 of the invention.
Figure 2:
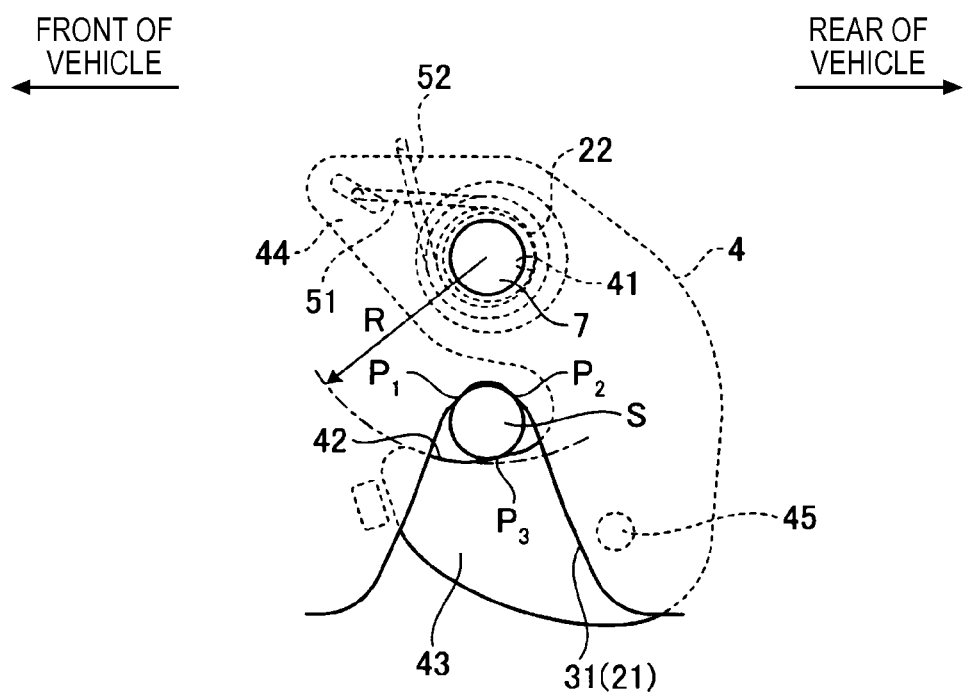
FIG. 2 is an enlarged view which shows a relationship between a latch and entrance grooves which are shown in FIG. 1.

FIG. 1 is a conceptual drawing which shows the configuration of a latch apparatus which configures Embodiment 1 of the invention. FIG. 2 is an enlarged view which shows a relationship between a latch and entrance grooves which are shown in FIG. 1.

A latch apparatus 1 described here as an example is used to fix a detachable seat or a movable seat and includes a case made up of a base plate 2 and a cover plate 3 which is attached to the base plate 2 in such a manner as to be superposed thereon and which is attached to the seat. Additionally, a latch accommodating portion is defined between the base plate 2 and the cover plate 3, and a latch 4 is accommodated in an interior thereof. As with a conventional one, the latch 4 is designed to be brought into engagement with a striker S which is provided on a surface of a floor.

Additionally, entrance grooves 21, 31 are formed in the base plate 2 and the cover plate 3, respectively, in substantially longitudinal central positions thereof as seen in a front-to-rear or longitudinal direction of the vehicle so as to extend substantially vertically from a floor side to a ceiling side. The entrance grooves 21, 31 are formed to have a width which enables the accommodation of the striker S therein, and deepest portions thereof are formed to have a gradually decreasing width towards a deepest point so that the deepest portions contact the striker S which enters at two points $P_1$, $P_2$, as shown in FIG. 2. A cylindrical latch shaft 22 is provided in a position lying above the entrance grooves 21, 31 so as to extend substantially horizontally along a widthwise direction of the vehicle body. The latch 4 is fitted on the latch shaft 22 so as to rotationally move therearound.

A shaft hole 41 is formed in the latch 4 in the center thereof for the latch shaft 22 to fit therein, and an engagement groove 42, a hook portion 43, a spring attaching portion 44 and a rod attaching portion 45 are formed along an outer circumference of the shaft hole 41.

Figures 1, 3:
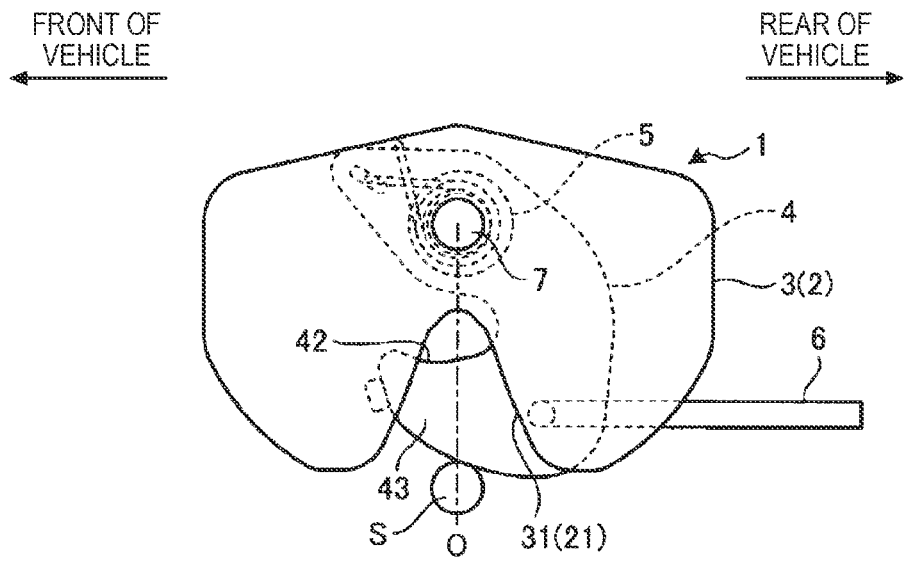
Figures 2, 3:
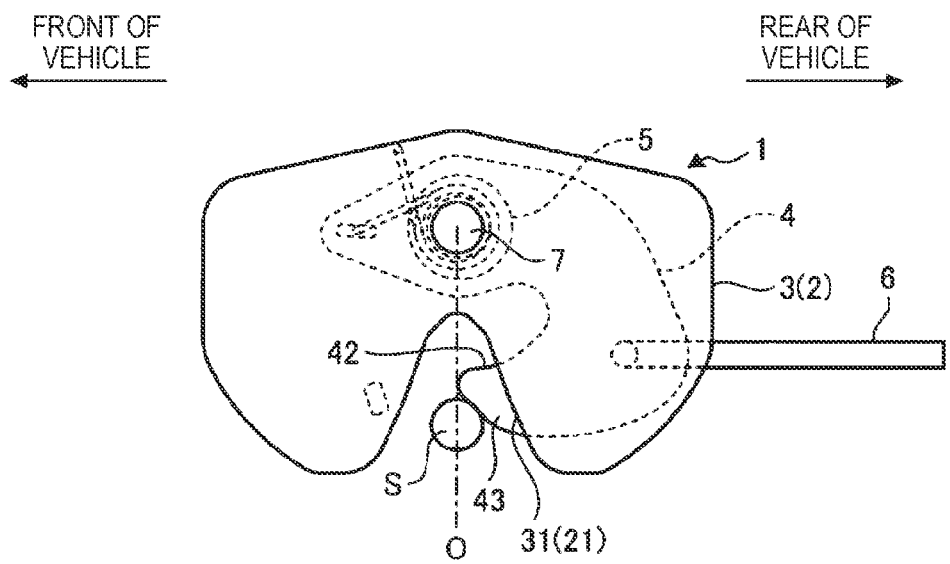
Figure 3:
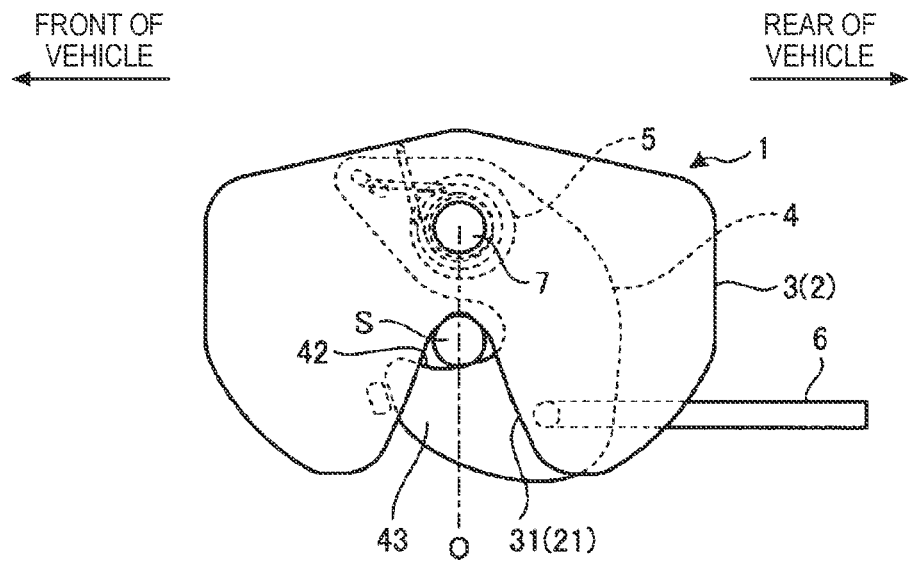

The engagement groove 42 is formed into an arc-like shape which extends inwards from an outer circumferential surface of the latch 4 centering at the shaft hole 41. The engagement groove 42 is given a width which enables the accommodation of the striker S therein. An open end portion (a distal end portion) of the engagement groove 42 is formed into an arc-like shape with a radius R centering at the shaft hole 41. By adopting this configuration, even though a force is applied to the striker S which is in engagement with the engagement groove 42 in a direction in which the striker S is disengaged, the rotational movement of the latch 4 can be restrained, thereby making it possible to prevent the striker S from being disengaged from the latch 4. Further, a portion of the engagement groove 42 extending from a middle portion to a deep portion thereof is formed into a tapered shape so that a width of the engagement groove 42 gradually narrows. By adopting this configuration, as shown in FIG. 3-3, the latch 4 which is in engagement with the striker S rotationally moves clockwise by means of an elastic restoring force of a hook spring 5 so that the striker S is supported at the deepest portions of the entrance grooves 21, 31 and a point $P_3$ on an inner wall of the engagement groove 42, whereby the seat is fixed in an ensured fashion without generating a rattling looseness between the latch apparatus 1 and the striker S.

Figures 3, 4:
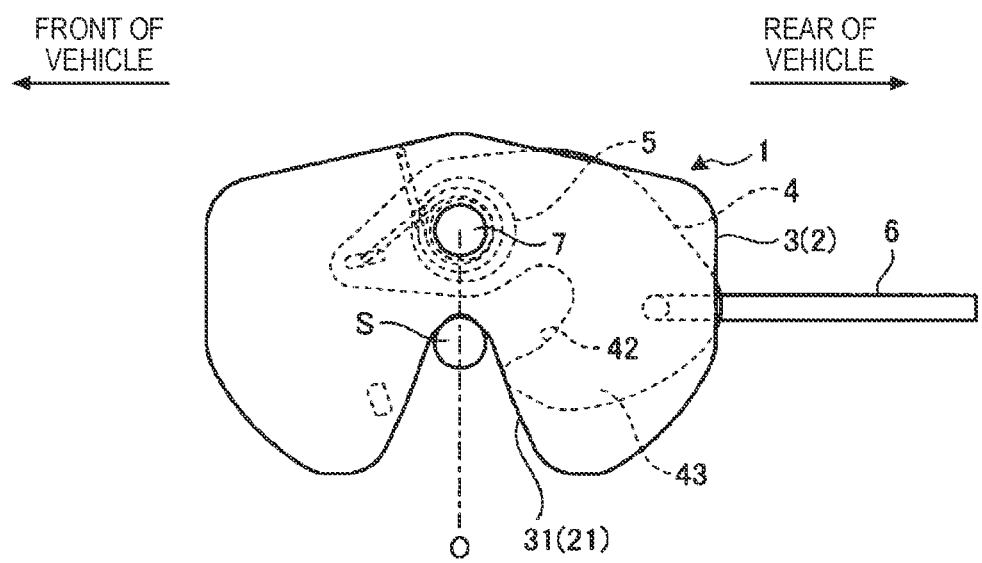
Figures 1, 4:
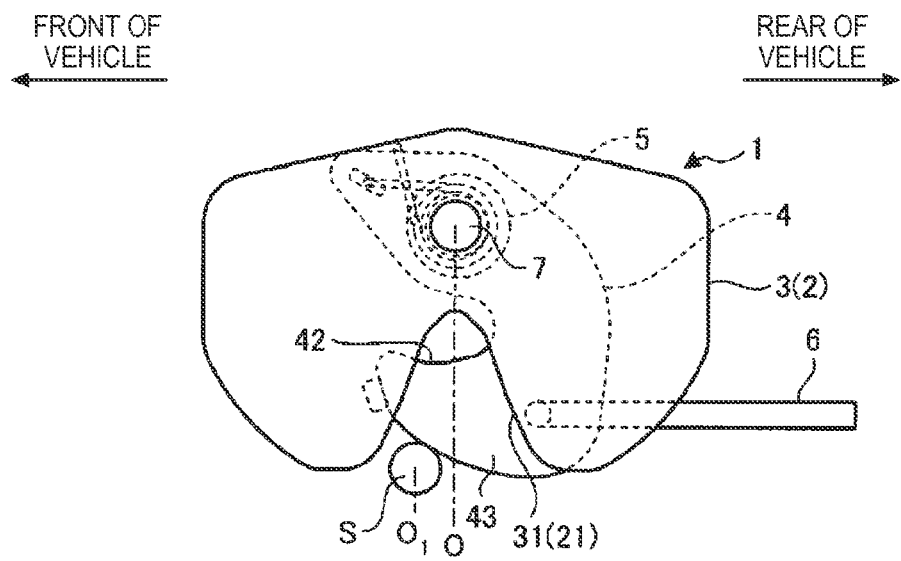
Figures 2, 4:
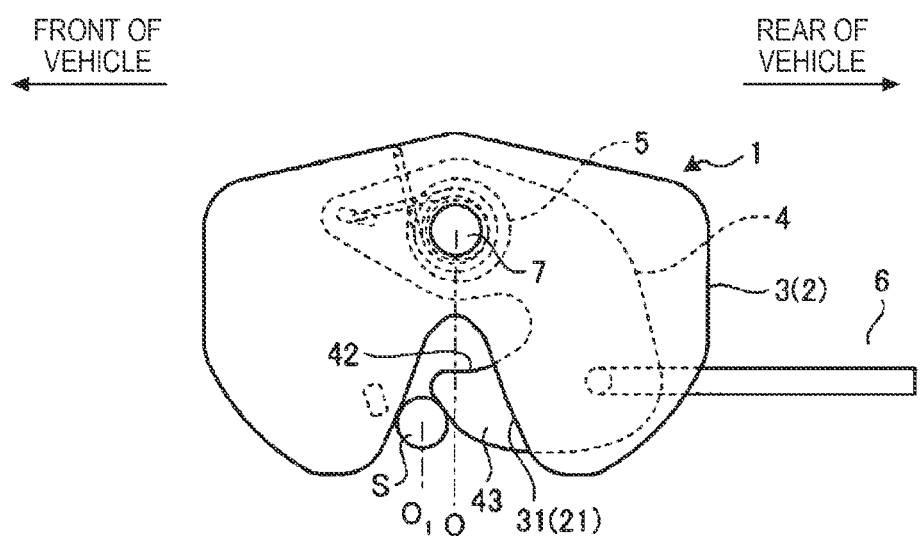
Figures 3, 4:
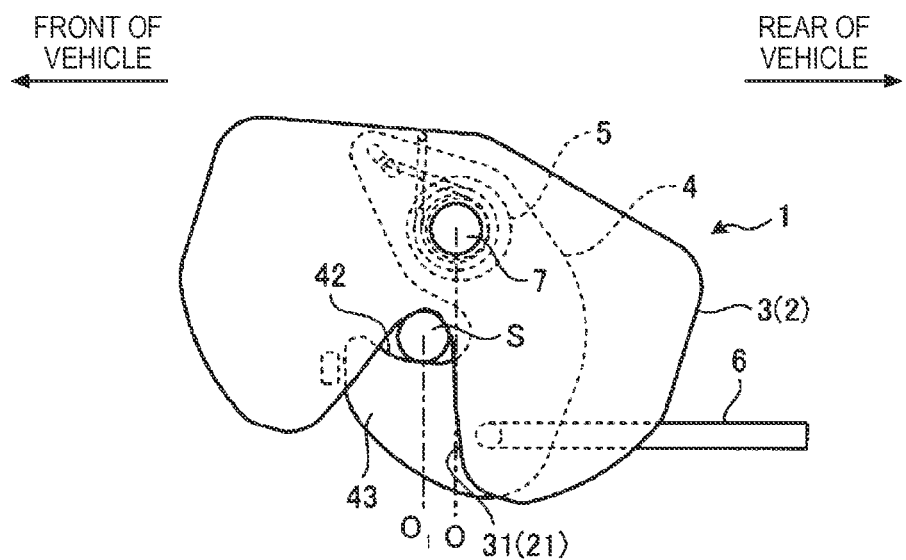
Figure 4:
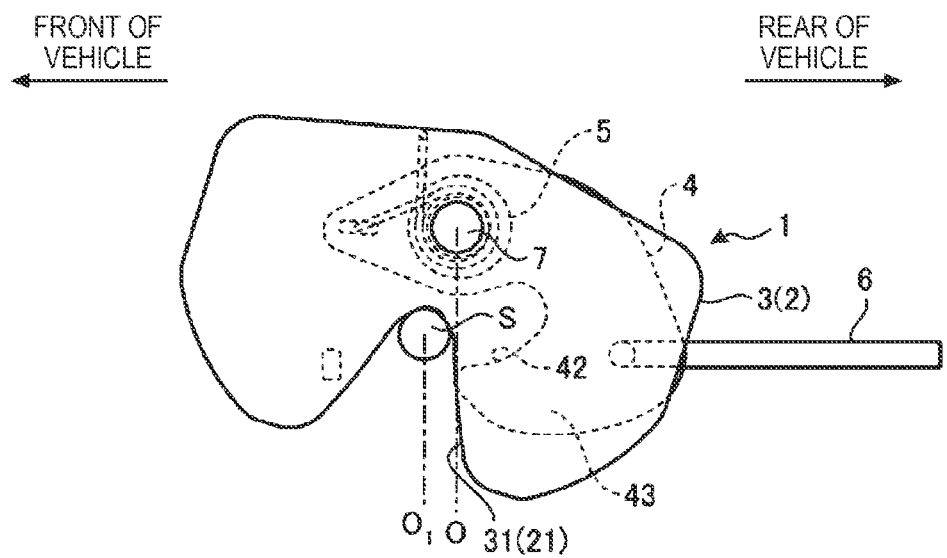

With the engagement groove 42 opened towards a side which faces a front of the vehicle, the hook portion 43 is a portion which is positioned below the engagement groove 42. This hook portion 43 is formed so that when the latch 4 is rotationally moved clockwise in FIG. 3, the hook portion 43 stops in a position where the hook portion 43 crosses the entrance grooves 21, 31 (an initial position, an engagement position) as shown in FIGS. 3-1 and 3-3, while when the latch 4 is rotationally moved counterclockwise in FIG. 3, the hook portion 43 stops in a position where the hook portion 43 opens the entrance grooves (an opening position) as shown in FIG. 3-4.

The spring attaching portion 44 is a portion which extends in an arbitrary direction (outwards) along a diametrical direction of the shaft hole 41. One end 51 of the hook spring (a torsional coil spring) 5 which is wound around the latch shaft 22 is attached to the spring attaching portion 44, and the other end 52 is attached to the base plate 2. By adopting this configuration, a clockwise elastic restoring force is applied to the latch 4 at all times as seen in FIG. 3, and this makes the latch 4 stop in the initial position and the engagement position (refer to FIGS. 3-1, 3-3).

The rod attaching portion 45 is a portion which is provided between the shaft hole 41 and the hook portion 43, and a rod (a pull rod) 6 is attached to the rod attaching portion 45. Then, when the rod 6 is pulled against the elastic restoring force of the hook spring 5, the latch 4 rotationally moves counterclockwise as seen in FIG. 3 (refer to FIG. 3-4).

In the latch apparatus 1 configured as described above, in such a state that the seat (not shown) has not yet been fixed to a floor (not shown), the latch 4 is disposed in the initial position as shown in FIG. 3-1. When the seat is inclined from that state, the striker S which is provided on the floor is brought into abutment with an outer circumference of the hook portion 43 to press against the outer circumference of the hook portion 43. This rotationally moves the latch 4 counterclockwise as seen in FIG. 3 against the elastic restoring force of the hook spring 5. Then, the latch 4 rotationally moves to a position which enables the striker S to enter the entrance grooves 21, 31.

When the seat is inclined further from the state described above, the striker S enters the entrance grooves 21, 31, while the elastic restoring force of the hook spring 5 is applied to the latch 4, whereby the latch 4 rotationally moves clockwise as seen in FIG. 3. Then, the striker S reaches the deepest portions of the entrance grooves 21, 31. In this state, the striker S is brought into abutment with the inner wall of the engagement groove 42, and therefore, the clockwise rotational movement of the latch 4 is prevented against the elastic restoring force of the hook spring 5. This enables the striker S to be supported at the two points $P_1$, $P_2$ of the deepest portions of the entrance grooves 21, 31 which gradually narrow towards the deepest point and the point $P_3$ on the inner wall of the engagement groove 42, as shown in FIG. 2. Moreover, as shown in FIG. 3-3, since the hook portion 43 of the latch 4 is disposed so as to cross the entrance grooves 21, 31, a situation in which the striker S moves in a direction in which the striker S is disengaged from the entrance grooves 21, 31, that is, an erecting operation of the seat relative to the floor is prevented by the hook portion 43 (an engagement state).

Further, when the rod 6 is pulled from the engagement state described above against the elastic restoring force of the hook spring 5, the latch 4 rotationally moves counterclockwise as seen in FIG. 3. As a result of this, as shown in FIG. 3-4, the entrance grooves 21, 31 are opened, which enables the striker S to move in a direction in which the striker S is disengaged from the entrance grooves 21, 31, whereby the seat can be operated to be erected relative to the floor.

The latch apparatus 1 described above includes a fastening member 7 which fastens the base plate 2 to the seat so as to move relative to the striker S within a range defined by projecting an area A onto the base plate 2, as shown in FIG. 1. The area A has a radius centering at the striker S which is in engagement with the latch 4, and the radius is equal to a length to an outermost position of the latch 4 being in engagement with the striker S.

The fastening member 7 is a stepped screw having a shank portion and penetrates axially the cylindrical latch shaft 22 to thereby pass through a rotation center of the latch 4 so as to fasten the base plate 2 and the cover plate 3 together so as to move relative to the striker S. By adopting this configuration, compared with a construction in which the fastening member 7 does not penetrate the latch shaft 22, the latch apparatus 1 can be made smaller in size.

In the latch apparatus 1 which is fastened by the fastening member 7 described above, as shown in FIG. 4, even with the striker S mounted in a front position $O_1$ which lies further forwards than a reference position O, by rotationally moving the base plate 2 and the cover plate 3 clockwise as seen in FIG. 4, the striker S is allowed not only to enter the entrance grooves 21, 31 to the deepest portions thereof but also to be brought into abutment with the inner wall of the engagement groove 42.

To describe this specifically, when the seat (not shown) is not yet fastened to the floor (not shown), as shown in FIG. 4-1, the latch 4 is disposed in the initial position. When the seat is inclined from that state, the striker S which is provided on the floor is brought into abutment with the outer circumference of the hook portion 43 to press against the outer circumference of the hook portion 43. This rotationally moves the latch 4 counterclockwise as seen in FIG. 4 against the elastic restoring force of the latch spring 5. Then, the latch 4 rotationally moves to a position which enables the striker S to enter the entrance grooves 21, 31.

When the seat is inclined further from the state described above, the striker S enters the entrance grooves 21, 31, while the elastic restoring force of the latch spring 5 is applied to the latch 4, whereby the latch 4 rotationally moves clockwise as seen in FIG. 4. Then, the striker S rotationally moves the base plate 2 and the cover plate 3 clockwise along the entrance grooves 21, 31 and reaches the deepest portions of the entrance grooves 21, 31. In this state, the base plate 2 and the cover plate 3 are inclined so that their front ends which face the front of the vehicle are raised and the striker S is brought into abutment with the inner wall of the engagement groove 42. This prevents the clockwise rotational movement of the latch 4 against the elastic restoring force of the latch spring 5, whereby the striker S is allowed to be supported at the two points of the deepest portions of the entrance grooves 21, 31 which gradually narrow towards the deepest point and the point on the inner wall of the engagement groove 42. Moreover, as shown in FIG. 4-3, since the hook portion 43 of the latch 4 is disposed so as to cross the entrance grooves 21, 31, a situation in which the striker S moves in a direction in which the striker S is dislocated from the entrance grooves 21, 31, that is, an erecting operation of the seat relative to the floor is prevented by the hook portion 43 (an engagement state).

Further, when the rod 6 is pulled from the engagement state described above against the elastic restoring force of the latch spring 5, the latch 4 rotationally moves counterclockwise as seen in FIG. 4. As a result of this, as shown in FIG. 4-4, the entrance grooves 21, 31 are opened, which enables the striker S to move in a direction in which the striker S is dislocated from the entrance grooves 21, 31, whereby the seat can be operated to be erected relative to the floor.

Figures 1, 5:
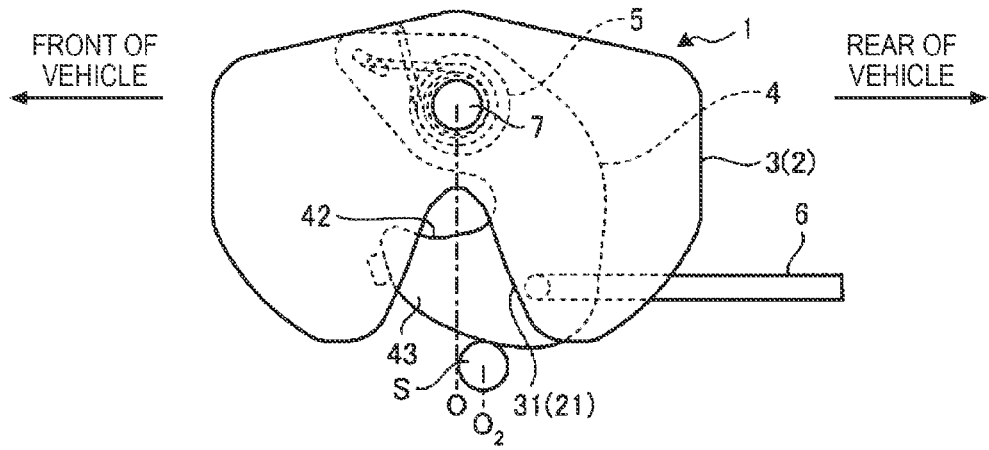
Figures 2, 5:
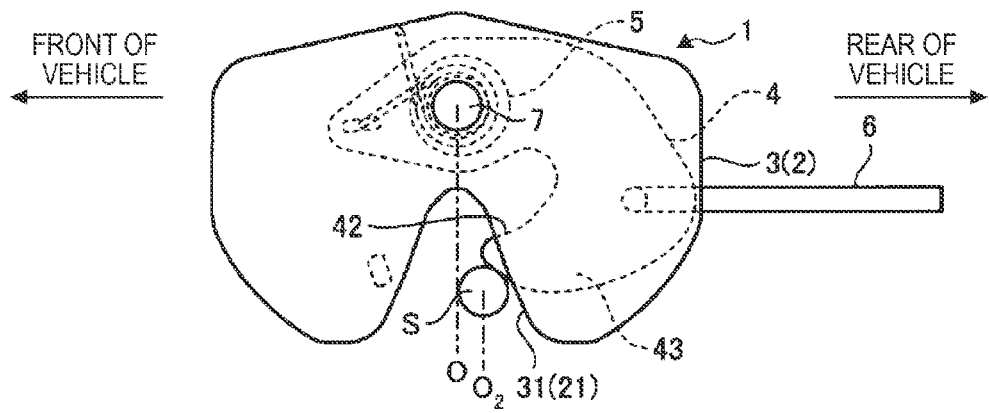
Figures 3, 5:
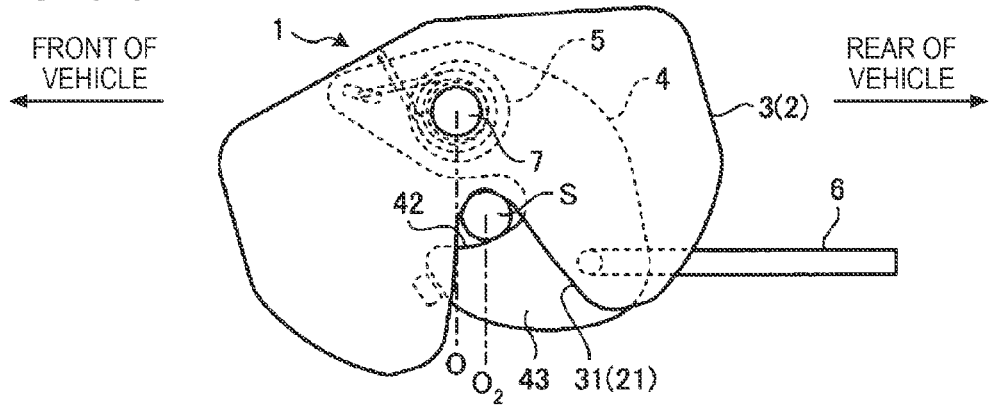
Figures 4, 5:
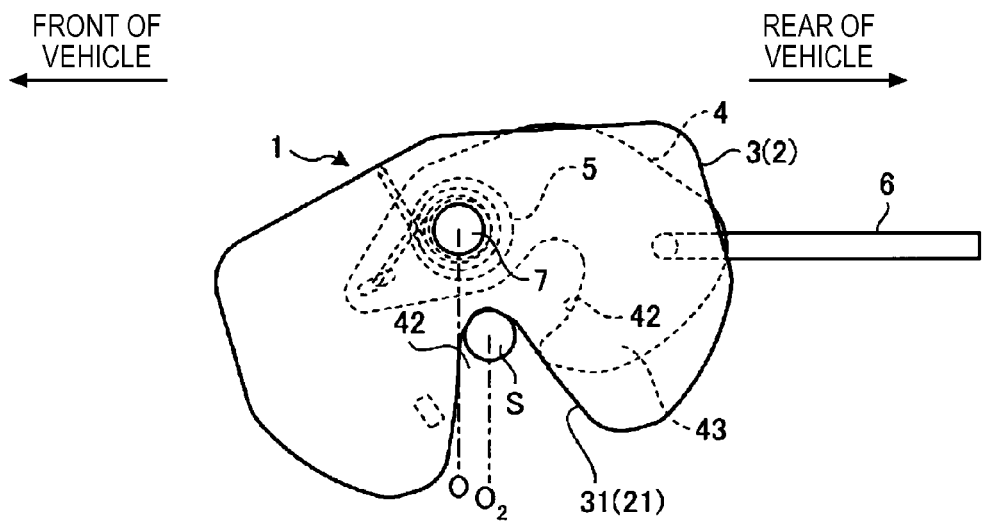

On the other hand, as shown in FIG. 5, even with the striker S mounted in a rear position $O_2$ which lies further rearwards than the reference position O, by rotationally moving the base plate 2 and the cover plate 3 counterclockwise as seen in FIG. 5, the striker S is allowed not only to enter the entrance grooves 21, 31 to the deepest portions thereof but also to be brought into abutment with the inner wall of the engagement groove 42.

To describe this specifically, when the seat (not shown) is not yet fastened to the floor (not shown), as shown in FIG. 5-1, the latch 4 is disposed in the initial position. When the seat is inclined from that state, the striker S which is provided on the floor is brought into abutment with the outer circumference of the hook portion 43 to press against the outer circumference of the hook portion 43. This rotationally moves the latch 4 counterclockwise as seen in FIG. 5 against the elastic restoring force of the hook spring 5. Then, the latch 4 rotationally moves to a position which enables the striker S to enter the entrance grooves 21, 31.

When the seat is inclined further from the state described above, the striker S enters the entrance grooves 21, 31, while the elastic restoring force of the hook spring 5 is applied to the latch 4, whereby the latch 4 rotationally moves clockwise as seen in FIG. 5. Then, the striker S rotationally moves the base plate 2 and the cover plate 3 counterclockwise along the entrance grooves 21, 31 and reaches the deepest portions of the entrance grooves 21, 31. In this state, the base plate 2 and the cover plate 3 are inclined so that their front ends which face the rear of the vehicle are raised and the striker S is brought into abutment with the inner wall of the engagement groove 42. This prevents the clockwise rotational movement of the latch 4 against the elastic restoring force of the hook spring 5, whereby the striker S is allowed to be supported at the two points of the deepest portions of the entrance grooves 21, 31 which gradually narrow towards the deepest point and the point on the inner wall of the engagement groove 42. Moreover, as shown in FIG. 5-3, since the hook portion 43 of the latch 4 is disposed so as to cross the entrance grooves 21, 31, a situation in which the striker S moves in a direction in which the striker S is disengaged from the entrance grooves 21, 31, that is, an erecting operation of the seat relative to the floor is prevented by the hook portion 43 (an engagement state).

Further, when the rod 6 is pulled from the engagement state above against the elastic restoring force of the latch spring 5, the latch 4 rotationally moves counterclockwise as seen in FIG. 5. As a result, as shown in FIG. 5-4, the entrance grooves 21, 31 are opened, whereby the striker S is allowed to move in the direction in which the striker S is dislocated from the entrance grooves 21, 31, and the seat can be erected relative to the floor.

The latch apparatus 1 described above, which configures Embodiment 1 of the invention, includes the fastening member 7 which fastens the base plate 2 so as to move relative to the striker S within the range defined by projecting the area A onto the base plate 2. The area A has a radius centering at the striker S which is in engagement with the latch 4, and the radius is equal to the length to the outermost position of the latch 4 which is in engagement with the striker S. Therefore, the latch apparatus 1 becomes small in size as a whole, and even though a large force is applied to the latch 4, there occurs no such situation that the base plate 2 and the cover plate 3 are turned up.

Additionally, in the latch apparatus 1, with the striker S having reached the deepest portions of the entrance grooves 21, 31, the striker S is brought into abutment with the inner wall of the engagement groove 42. As this occurs, as shown in FIG. 2, the striker S is supported at the two points $P_1$, $P_2$ of the deepest portions of the entrance grooves 21, 31 which gradually narrow towards the deepest point and the point $P_3$ on the engagement groove 42, and therefore, the striker S is supported by the three points near a widthwise center of the entrance grooves 21, 31 to thereby be restrained. This eliminates the occurrence of a rattling looseness between the latch apparatus 1 and the striker S, whereby the seat is fixed in an ensured fashion. In addition, as this occurs, the latch 4 applies no force in the widthwise direction of the vehicle main body (a near side direction or a far side direction of the sheet of paper on which FIG. 2 is drawn), and therefore, there occurs no such situation that the base plate 2 and the cover plate 3 are turned up.

Additionally, even with the striker S mounted in the front position $O_1$ which lies further forwards than the reference position O, in such a state that the striker S has reached the deepest portions of the entrance grooves 21, 31, the striker is brought into abutment with the inner wall of the engagement groove 42. As this occurs, too, as with the case where the striker S is mounted in the reference position O, as shown in FIG. 4-3, the striker S is supported at the two points of the deepest portions of the entrance grooves 21, 31 which gradually narrow towards the deepest point and the point on the engagement groove 42, and therefore, the striker S is supported by the three points near the widthwise center of the entrance grooves 21, 31 to thereby be restrained. This eliminates the occurrence of a rattling looseness between the latch apparatus 1 and the striker S, even with the striker S mounted in the front position $O_1$ which lies further forwards than the reference position O, whereby the seat is fixed in an ensured fashion. In addition, as this occurs, the latch 4 applies no force in the widthwise direction of the vehicle main body (a near side direction or a far side direction of each of sheets of paper on which FIG. 4 is drawn), and therefore, there occurs no such situation that the base plate 2 and the cover plate 3 are turned up. Additionally, since the fastening member 7 passes through the rotation center of the latch 4 to be fastened, a gap between the striker S which is in engagement with the latch 4 and itself can be made small.

In addition, even with the striker S mounted in the rear position $O_2$ which lies further rearwards than the reference position O, in such a state that the striker S has reached the deepest portions of the entrance grooves 21, 31, the striker is brought into abutment with the inner wall of the engagement groove 42. As this occurs, too, as with the case where the striker S is mounted in the reference position O, as shown in FIG. 5-3, the striker S is supported at the two points of the deepest portions of the entrance grooves 21, 31 which gradually narrow towards the deepest point and the point on the engagement groove 42, and therefore, the striker S is supported by the three points near the widthwise center of the entrance grooves 21, 31 to thereby be restrained. This eliminates the occurrence of a rattling looseness between the latch apparatus 1 and the striker S, even with the striker mounted in the rear position $O_2$ which lies further rearwards than the reference position O, whereby the seat is fixed in an ensured fashion. In addition, as this occurs, the latch 4 applies no force in the widthwise direction of the vehicle main body (a near side direction or a far side direction of each of sheets of paper on which FIG. 5 is drawn), and therefore, there occurs no such situation that the base plate 2 and the cover plate 3 are turned up.

Embodiment 2

Figure 6:
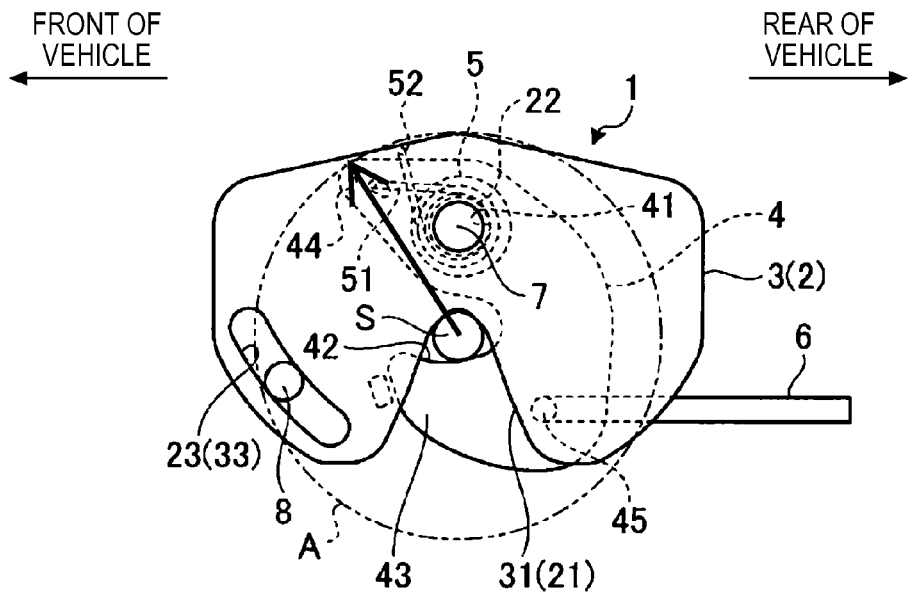
FIG. 6 is a conceptual drawing which shows the configuration of a latch apparatus which configures Embodiment 2 of the invention.

FIG. 6 is a conceptual drawing which shows the configuration of a latch apparatus which configures Embodiment 2 of the invention. Additionally, FIG. 7 is a drawing which shows in detail a cylindrical latch shaft shown in FIG. 6, and FIG. 8 is a drawing which shows in detail an elongated hole shown in FIG. 6.

The latch apparatus which configures Embodiment 2 of the invention is such that a second fastening member 8 is added further to the latch apparatus 1 which configures Embodiment 1 which has been described above, and like reference numerals will be given to configurations like to those of the latch apparatus of Embodiment 1 described above, and the description thereof will be omitted here.

As shown in FIG. 6, the second fastening member 8 fastens a base plate 2 and a cover plate 3 so as to move relative to a striker S together with a fastening member 7 and is inserted through arc-shaped elongated holes 23, 33 which are provided in front sides of entrance grooves 21, 31 of the base plate 2 and the cover plate 3 which face a front of the vehicle. The arc-shaped elongated holes 23, 33 are formed so as to be centered at a rotation center of a latch 4, or specifically, a center axis of a cylindrical latch shaft 22, and hence, there is no such situation that the second fastening member 8 interrupts the rotational movement of the base plate 2 and the cover plate 3. Additionally, the arc-shaped elongated holes 23, 33 limit rotationally movable ranges of the base plate 2 and the cover plate 3, respectively.

Figure 7:
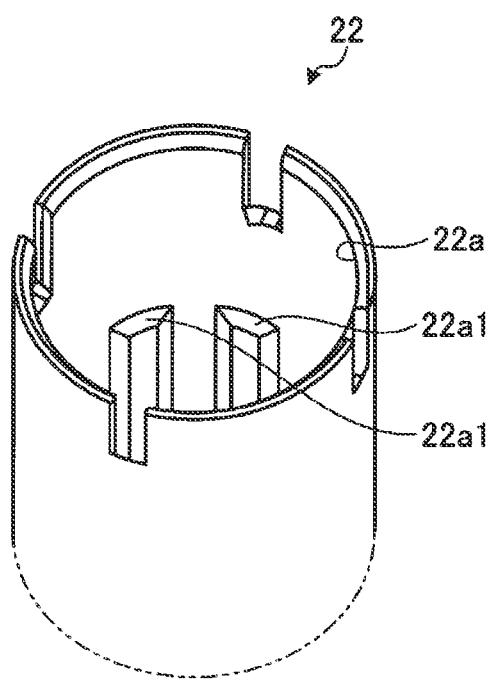
FIG. 7 is a drawing which shows in detail a cylindrical latch shaft shown in FIG. 6.
Figure 8:
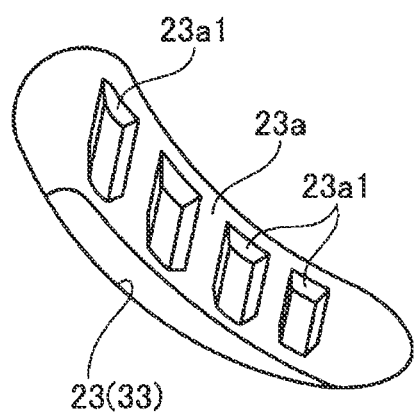
FIG. 8 is a drawing which shows in detail an elongated hole shown in FIG. 6.

Additionally, as shown in FIG. 7, a plurality of ribs 22a1 (an example of a posture maintaining portion, a sliding portion) which generate sliding resistance with a shank portion of the fastening member 7 are provided on an inner wall surface (an inner circumference of a hole) 22a of the cylindrical latch shaft 22 through which the fastening member 7 is inserted. The ribs 22a1 protrude radially inwards from the inner wall surface 22a of the cylindrical latch shaft 22 and can maintain the postures of the base plate 2 and the cover plate 3. By adopting this configuration, the posture of the latch apparatus 1 which is inclined by the engagement of the latch apparatus 1 with a striker S is maintained.

In addition, as shown in FIG. 8, a plurality of ribs 23a1 which generate sliding resistance with a shank portion of the second fastening member 8 are provided on an inner circumference of the elongated hole (the elongated hole formed in the base plate 2) 23 through which the second fastening member 8 is inserted. The ribs 23a1 protrude radially inwards from the inner circumference 23a of the elongated hole 23 and can maintain the postures of the base plate 2 and the cover plate 3. By adopting this configuration, the posture of the latch apparatus 1 which is inclined by the engagement of the latch apparatus 1 with a striker S is maintained.

In the latch apparatus 1 which configures Embodiment 2 of the invention, since the second fastening member 8 fastens the base plate 2 and the cover plate 3 so as to move relative to the striker S together with the fastening member 7, a fastening strength is increased, and a possibility that the base plate 2 and the cover plate 3 are damaged is decreased. Additionally, the second fastening member 8 is inserted through the arc-shaped elongated holes 23, 33 which are provided in the front sides of the entrance grooves 21, 31 which face the front of the vehicle and which are situated near locations on the base plate 2 and the cover plate 3 where a distal end portion of a hook portion 43 of the latch 4 is projected. Therefore, a fastening strength in a widthwise direction of the vehicle (a near side direction or a far side direction of a sheet of paper on which FIG. 6 is drawn) is ensured. Thus, even though a large force is applied to the latch 4, there occurs no such situation that the base plate 2 and the cover plate 3 are turned up. Additionally, since the rotationally movable ranges of the base plate 2 and the cover plate 3 are limited by the second fastening member 8 and the elongated holes 23, 33, there occurs no such situation that the latch apparatus 1 rotates over a range where the striker S is allowed to enter the entrance grooves 21, 31.

Further, the ribs 22a1 which generate the sliding resistance with the fastening member 7 are provided on the inner wall surface 22a of the cylindrical latch shaft 22 through which the fastening member 7 is inserted and the ribs 23a1 which generate the sliding resistance with the second fastening member 8 are provided on the inner circumference 23 of the elongated hole 23 through which the second fastening member 8 is inserted. Therefore, the posture of the latch apparatus 1 can be maintained. By adopting this configuration, the posture of the latch apparatus 1 which is in engagement with the striker S is maintained, whereby a situation is avoided in which the latch apparatus 1 rotationally moves every time the seat is fixed.

It is noted that the ribs 22a1, 23a1 do not have to be provided on both the inner wall surface 22a of the cylindrical latch shaft 22 and the inner circumference 23a of the elongated hole 23, and hence, according to the sliding resistance which is required to maintain the posture of the latch apparatus, the ribs 22a1, 23a1 can be provided on either or both of the cylindrical latch shaft 22 and the elongated hole 23.

Figure 9:
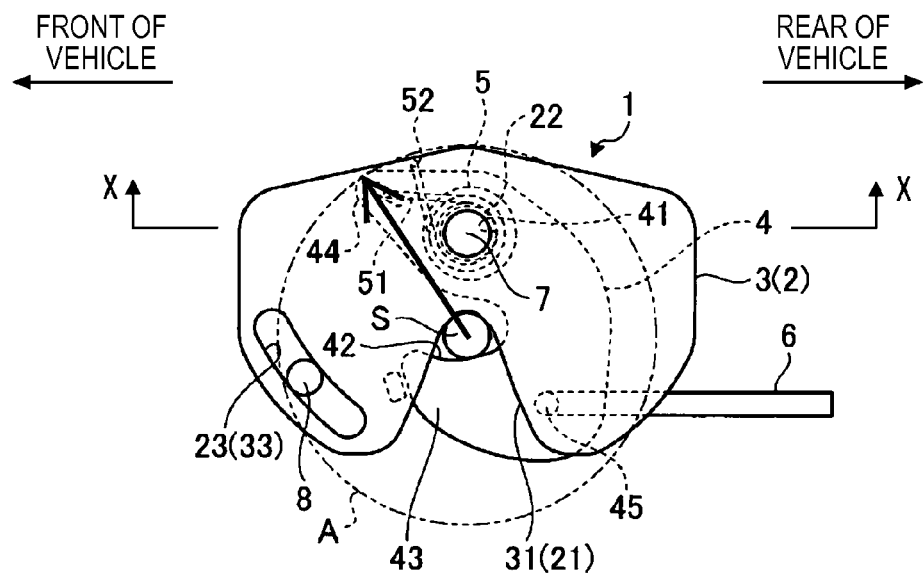
FIG. 9 is a conceptual drawing which shows the configuration of a modified example made to the latch apparatus shown in FIG. 6.
Figure 10:
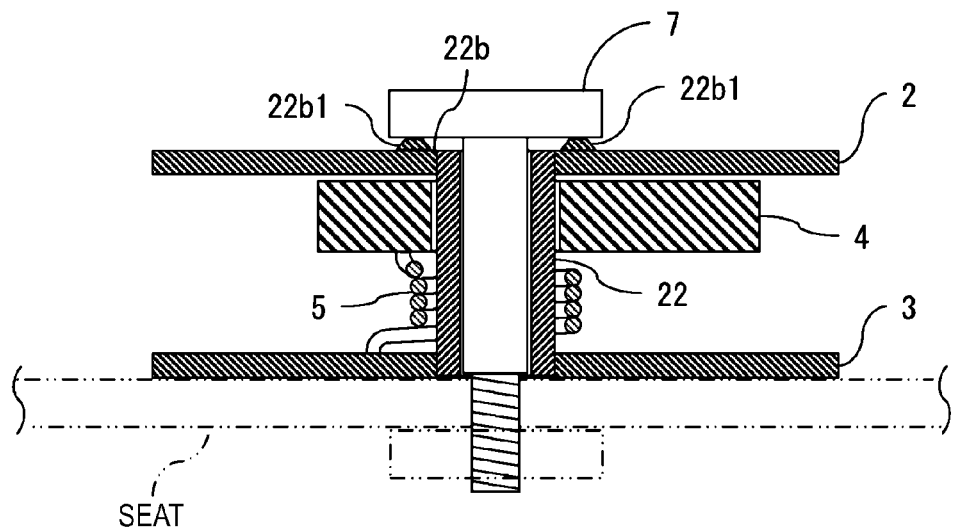
FIG. 10 is a drawing showing a sectional view of the latch apparatus shown in FIG. 9 which is taken along the line X-X shown therein.

FIG. 9 is a conceptual drawing which shows the configuration of a modified example made to the latch apparatus shown in FIG. 6, and FIG. 10 is a drawing which shows a sectional view of the latch apparatus shown in FIG. 9 taken along the line X-X therein.

The latch apparatus described here differs from the latch apparatus shown in FIG. 6 in the configuration to generate the sliding resistance between the fastening member 7 and the second fastening member 8 when maintaining the postures of the base plate 2 and the cover plate 3. The other configurations are the same as those of the latch apparatus shown in FIG. 6, and hence, like reference numerals will be given to like configurations to those of the latch apparatus shown in FIG. 6, and the description thereof will be omitted here.

As shown in FIG. 10, a plurality of ribs 22b1 (an example of a posture maintaining portion, a sliding portion) which generate sliding resistance with a dish-shaped head portion of the fastening member 7 which is inserted through an opening in the latch shaft 22 are provided on an edge portion 22b of the opening on an external surface of the base plate 2 so as to be aligned along the opening. The ribs 22b1 protrude from the external surface of the base plate 2, so that the ribs 22b1 can maintain the postures of the base plate 2 and the cover plate 3. By adopting this configuration, the posture of the latch apparatus 1 which is inclined by the engagement of the latch apparatus 1 with the striker S is maintained.

It is noted that in addition to the ribs 22b1, the ribs 22a1 on the inner wall surface 22a of the latch shaft 22 and the ribs 23a1 on the inner circumference 23a of the elongated hole 23 of the latch apparatus shown in FIG. 6 can also be provided according to the sliding resistance required to maintain the posture of the latch apparatus.

Embodiment 3

Figure 11:
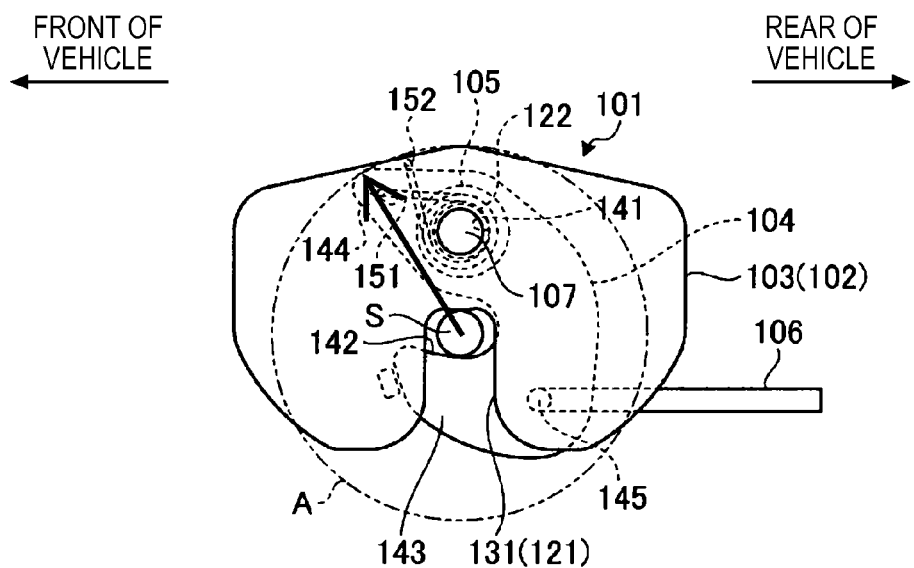
FIG. 11 is a conceptual drawing which shows the configuration of a latch apparatus which configures Embodiment 3 of the invention.
Figure 12:
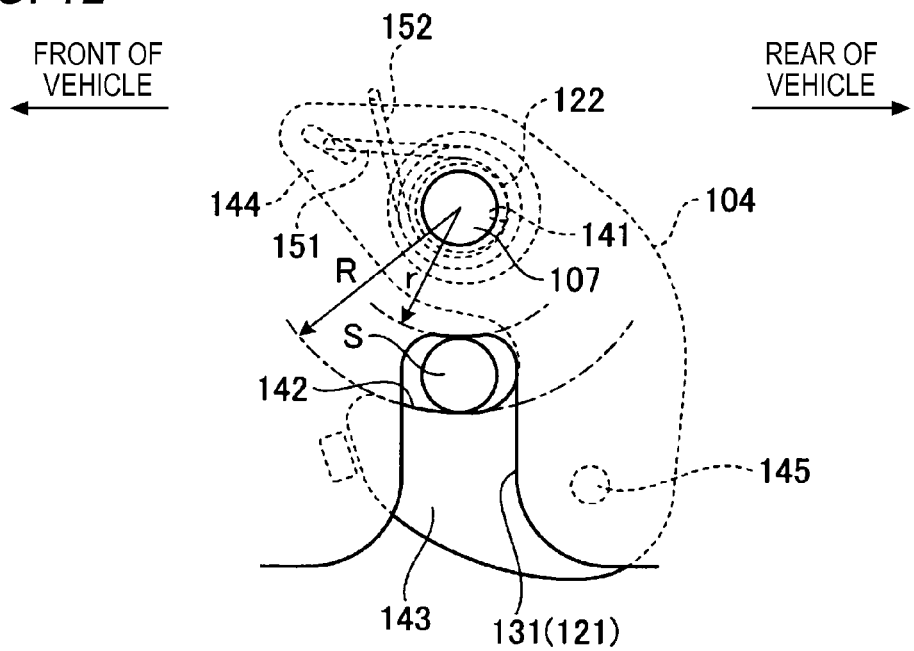
FIG. 12 is an enlarged view which shows a relationship between a latch and entrance grooves which are shown in FIG. 11.

FIG. 11 is a conceptual drawing which shows the configuration of a latch apparatus which configures an embodiment of the invention. FIG. 12 is an enlarged view which shows a relationship between a latch and entrance grooves which are shown in FIG. 1.

As with the latch apparatus 1 described in Embodiment 1 above, a latch apparatus 101 described here as an example is used to fix a detachable seat or a movable seat and includes a base plate 102 and a cover plate 103 which is attached to the base plate 102 in such a manner as to be superposed thereon. Additionally, a hook accommodating portion is defined between the base plate 102 and the cover plate 103, and a latch 104 is accommodated in an interior thereof. As with the one described above, the latch 104 is designed to be brought into engagement with a striker S which is provided on a floor surface.

Additionally, entrance grooves 121, 131 are formed in the base plate 102 and the cover plate 103, respectively, in substantially longitudinal central positions thereof as seen in a front-to-rear or longitudinal direction of the vehicle so as to extend substantially vertically from a floor side towards a ceiling side. The entrance grooves 121, 131 are formed to have a width which enables the accommodation of the striker S therein, and deepest portions thereof are formed into an arc-like shape which is centered at a latch shaft 122, which will be described later, and which has a radius "r" as shown in FIG. 12. The latch shaft 122 having a cylindrical shape is provided in a position lying above the entrance grooves 121, 131 so as to extend substantially horizontally along a widthwise direction of the vehicle main body. The latch 104 is fitted on the latch shaft 122 so as to rotationally move therearound.

A shaft hole 141 is formed in the latch 104 in the center thereof for the latch shaft 122 to fit therein, and an engagement groove 142, a hook portion 143, a spring attaching portion 144 and a rod attaching portion 145 are formed along an outer circumference of the shaft hole 141.

The engagement groove 142 is formed into an arc-like shape which extends inwards from an outer circumferential surface of the latch 104 so as to be centered at the shaft hole 141 (the latch shaft 122) and which has a radius R. The engagement groove 142 is given a width which enables the accommodation of the striker S therein. In addition, the engagement groove 142 is formed to extend with substantially the same width from an entrance of an opening to a deep portion thereof.

With the engagement groove 142 opened towards a side which faces a front of the vehicle, the hook portion 143 is a portion which is positioned below the engagement groove 142. This hook portion 143 is formed so that when the latch 104 is rotationally moved clockwise as seen in FIG. 13, the hook portion 143 stops in a position where the hook portion 143 crosses the entrance grooves 121, 131 (an initial position, an engagement position) as shown in FIGS. 13-1 and 13-3, while when the latch 104 is rotationally moved counterclockwise as seen in FIG. 13, the hook portion 143 stops in a position where the hook portion 143 opens the entrance grooves 121, 131 (an opening position) as shown in FIG. 13-4.

The spring attaching portion 144 is a portion which extends in an arbitrary direction (outwards) along a diametrical direction of the shaft hole 141. One end 151 of the hook spring (a torsional coil spring) 105 which is wound around the latch shaft 122 is attached to the spring attaching portion 144, and the other end 152 is attached to the base plate 102. By adopting this configuration, a clockwise elastic restoring force is applied to the latch 104 at all times as seen in FIG. 13, and this makes the latch 104 stop in the initial position and the engagement position (refer to FIGS. 13-1, 13-3).

The rod attaching portion 145 is a portion which is provided between the shaft hole 141 and the hook portion 143, and a rod (a pull rod) 106 is attached to the rod attaching portion 145. Then, when the rod 106 is pulled against the elastic restoring force of the hook spring 105, the latch 104 rotationally moves counterclockwise as seen in FIG. 13 (refer to FIG. 13-4).

Figures 1, 13:
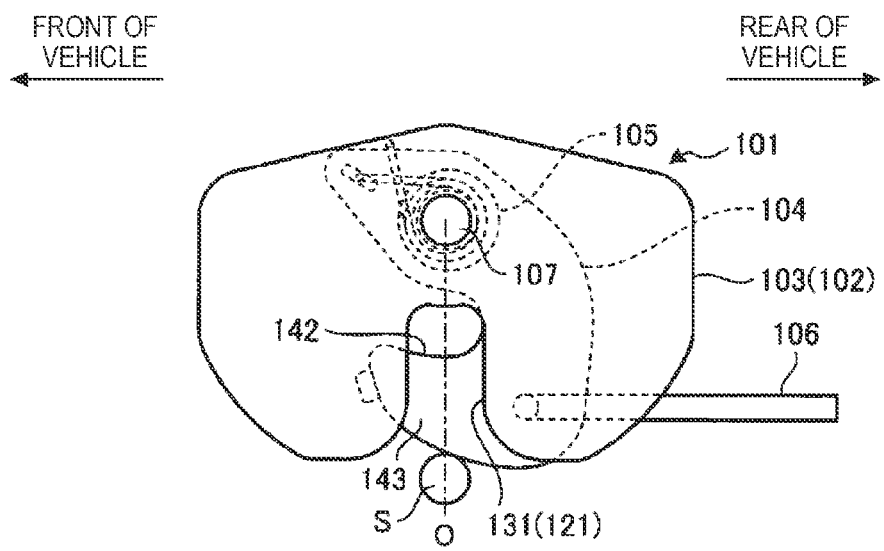
Figures 2, 13:
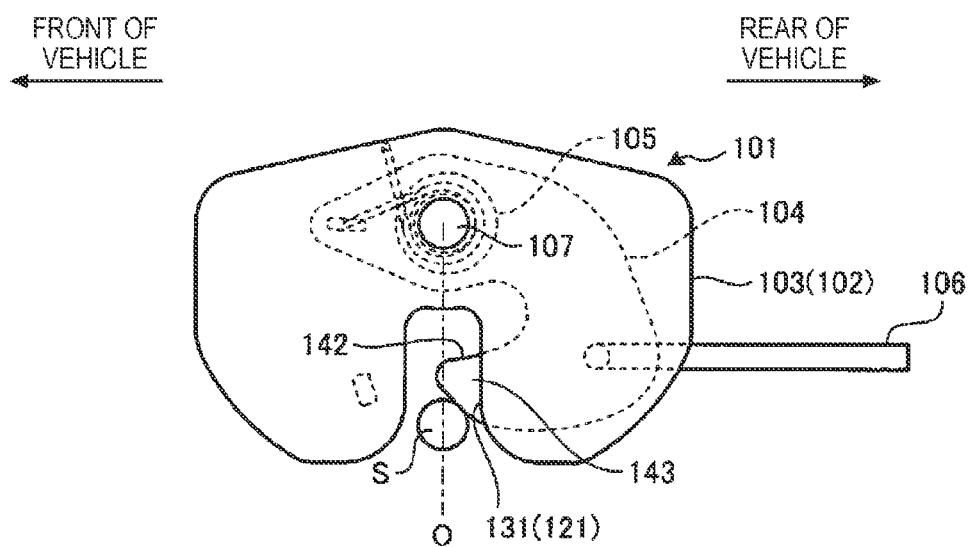
Figures 3, 13:
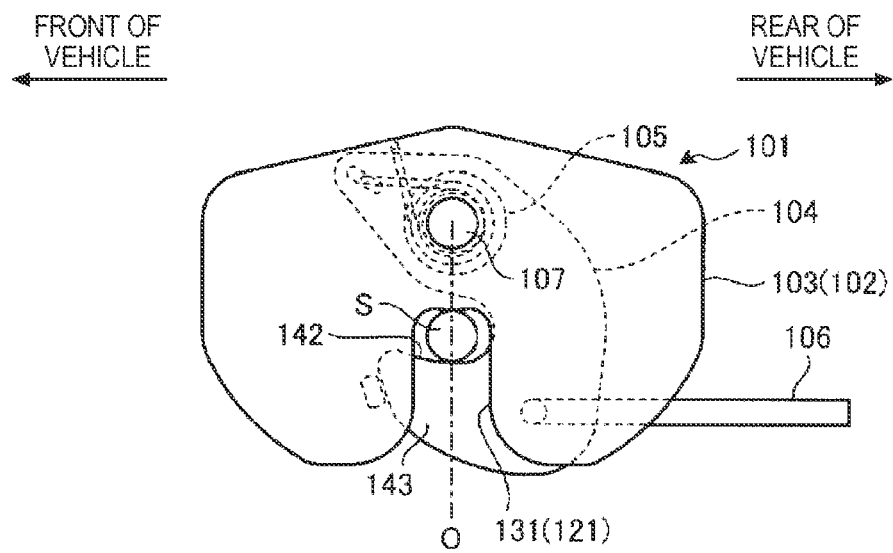
Figures 4, 13:
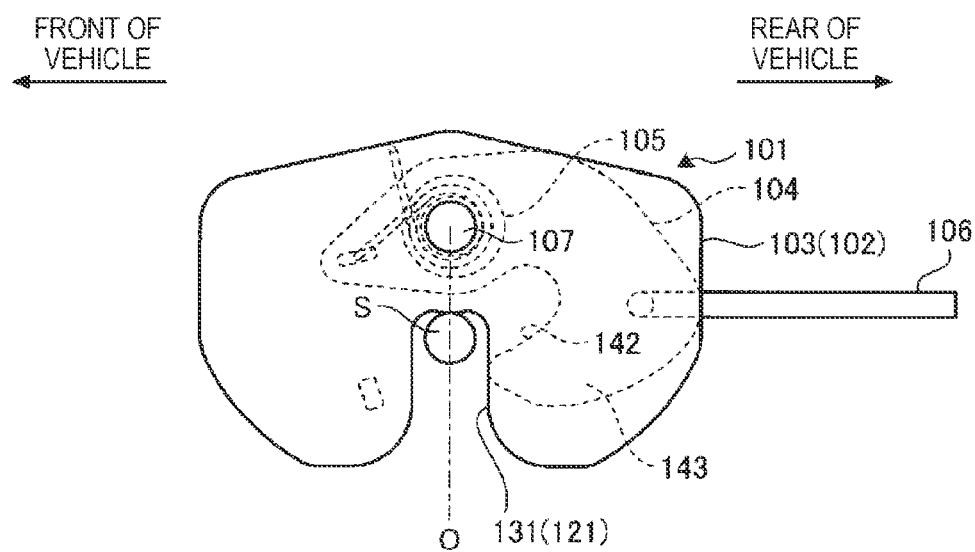

In the latch apparatus 101 configured as described above, in such a state that the seat (not shown) has not yet been fixed to a floor (not shown), the latch 104 is disposed in the initial position as shown in FIG. 13-1. When the seat is inclined from that state, the striker S which is provided on the floor is brought into abutment with an outer circumference of the hook portion 143 to press against the outer circumference of the hook portion 143. This rotationally moves the latch 104 counterclockwise as seen in FIG. 13 against the elastic restoring force of the hook spring 105. Then, the latch 104 rotationally moves to a position which enables the striker S to enter the entrance grooves 121, 131.

When the seat is inclined further from the state described above, the striker S enters the entrance grooves 121, 131, while the elastic restoring force of the hook spring 105 is applied to the latch 104, whereby the latch 104 rotationally moves clockwise as seen in FIG. 13. Then, the striker S reaches the deepest portions of the entrance grooves 121, 131. In this state, the striker S is brought into abutment with an inner wall of the engagement groove 42, and therefore, the clockwise rotational movement of the latch 104 is prevented against the elastic restoring force of the hook spring 105. Moreover, as shown in FIG. 13-3, since the hook portion 143 of the latch 104 is disposed so as to cross the entrance grooves 121, 131, a situation in which the striker S moves in a direction in which the striker S is disengaged from the entrance grooves 121, 131, that is, an erecting operation of the seat relative to the floor is prevented by the hook portion 143 (an engagement state).

The latch apparatus 101 described above includes a fastening member 107 which fastens the base plate 102 so as to move relative to the striker S within a range defined by projecting an area A onto the base plate 102, as shown in FIG. 11. The area A has a radius centering at the striker S which is in engagement with the latch 104, and the radius is equal to a length to an outermost position of the latch 104 which is in engagement with the striker S.

The fastening member 107 is a stepped screw having a shank portion and penetrates axially the cylindrical latch shaft 122 to thereby pass through a rotation center of the latch 104 so as to fasten the base plate 102 and the cover plate 103 together so as to move relative to the striker S. By adopting this configuration, compared with a construction in which the fastening member 107 does not penetrate the latch shaft 122, the latch apparatus 101 can be made smaller in size.

In the latch apparatus 101 which is fastened by the fastening member 107 described above, as shown in FIG. 14, even with the striker S mounted in a front position $O_3$ which lies further forwards than a reference position O, by rotating the base plate 102 and the cover plate 103 clockwise as seen in FIG. 14, the striker S is allowed not only to enter the entrance grooves 121, 131 to the deepest portions thereof but also to be brought into abutment with the inner wall of the engagement groove 142.

Figures 1, 14:
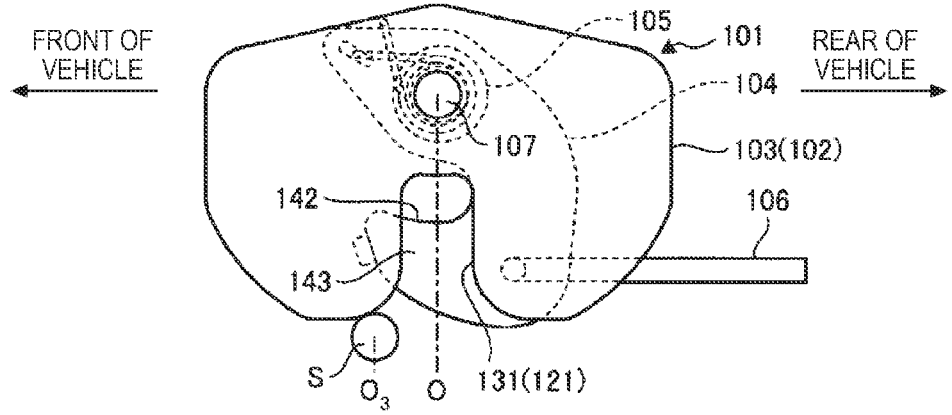
Figures 2, 14:
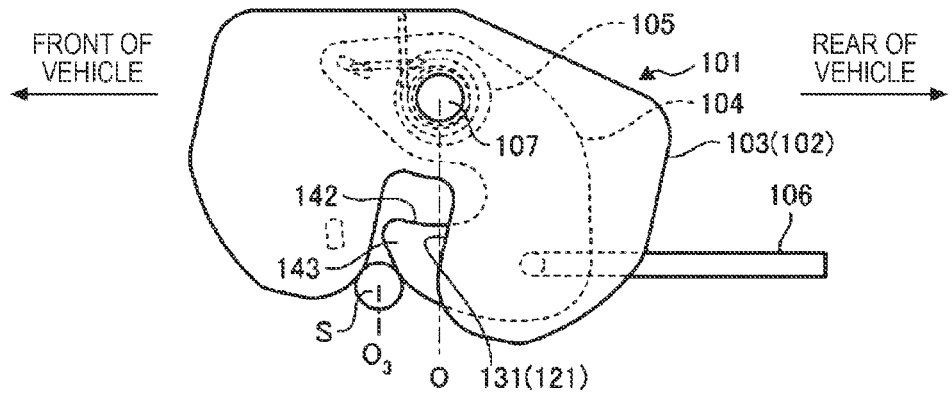
Figures 3, 14:
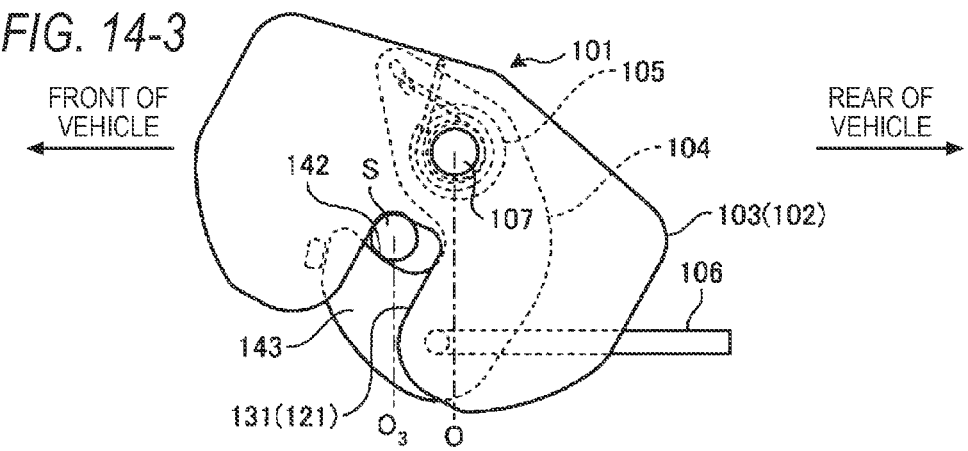
Figures 4, 14:
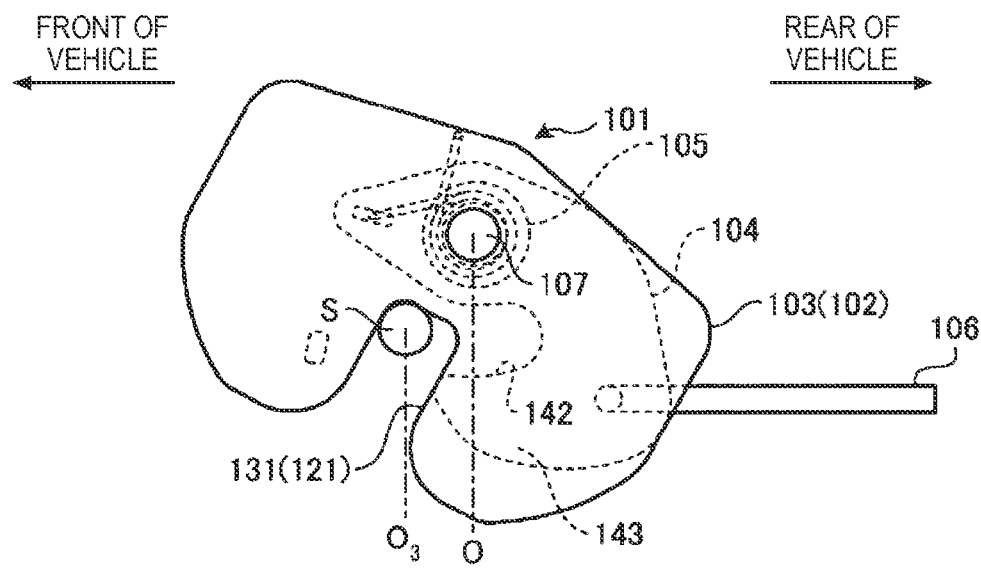

To describe this specifically, when the seat (not shown) is not yet fastened to the floor (not shown), as shown in FIG. 14-1, the latch 104 is disposed in the initial position. When the seat is inclined from that state, the striker S which is provided on the floor is brought into abutment with inner walls of the entrance grooves 121, 131 of the base plate 102 and the cover plate 103 to press against the inner walls of the entrance grooves 121, 131. This rotationally moves the base plate 102 and the cover plate 103 clockwise as seen in FIG. 14. Thereafter, the striker S is brought into abutment with an outer circumference of the hook portion 143 of the latch 104 to press against the outer circumference of the hook portion 143. Then, the latch 4 rotationally moves counterclockwise as seen in FIG. 14 against the elastic restoring force of the latch spring 105. Then, the striker S rotationally moves the latch 104 to a position where the striker S is allowed to enter the entrance grooves 121. 131.

When the seat is inclined further from the state described above, the striker S enters the entrance grooves 121, 131, while the elastic restoring force of the latch spring 105 is applied to the latch 104, whereby the latch 104 rotationally moves clockwise as seen in FIG. 14. Then, the striker S rotationally moves the base plate 102 and the cover plate 103 clockwise along the entrance grooves 121, 131 and reaches the deepest portions of the entrance grooves 121, 131. In this state, the base plate 102 and the cover plate 103 are inclined so that their front ends which face the front of the vehicle are raised and the striker S is brought into abutment with the inner wall of the engagement groove 142. Moreover, as shown in FIG. 14-3, since the hook portion 143 of the latch 104 is disposed so as to cross the entrance grooves 121, 131, a situation in which the striker S moves in a direction in which the striker S is dislocated from the entrance grooves 121, 131, that is, an erecting operation of the seat relative to the floor is prevented by the hook portion 143 (an engagement state).

Further, when the rod 106 is pulled from the engagement state described above against the elastic restoring force of the latch spring 105, the latch 104 rotationally moves counterclockwise as seen in FIG. 14. As a result of this, as shown in FIG. 14-4, the entrance grooves 121, 131 are opened, which enables the striker S to move in a direction in which the striker S is dislocated from the entrance grooves 121, 131, whereby the seat can be operated to be erected relative to the floor.

Figures 1, 15:
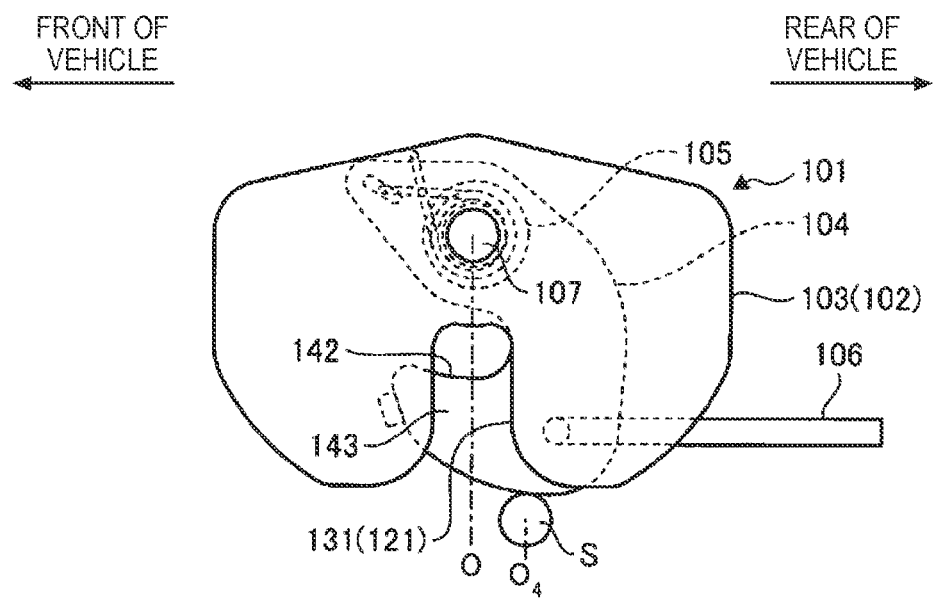
Figures 2, 15:
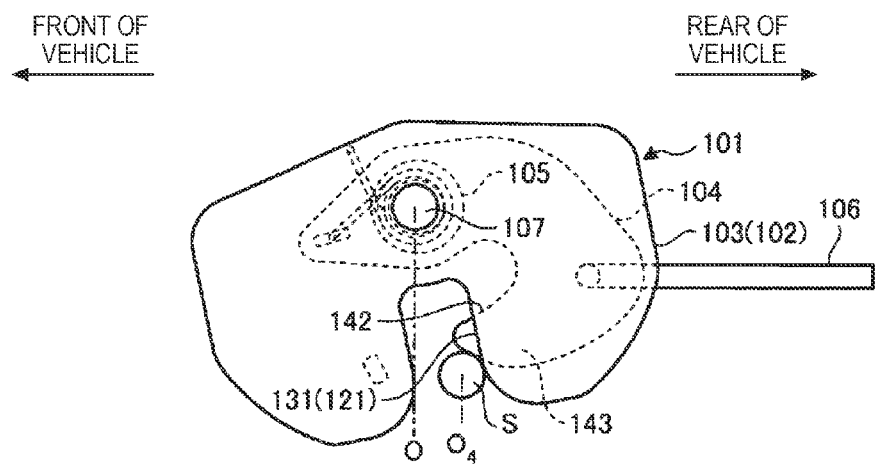
Figures 3, 15:
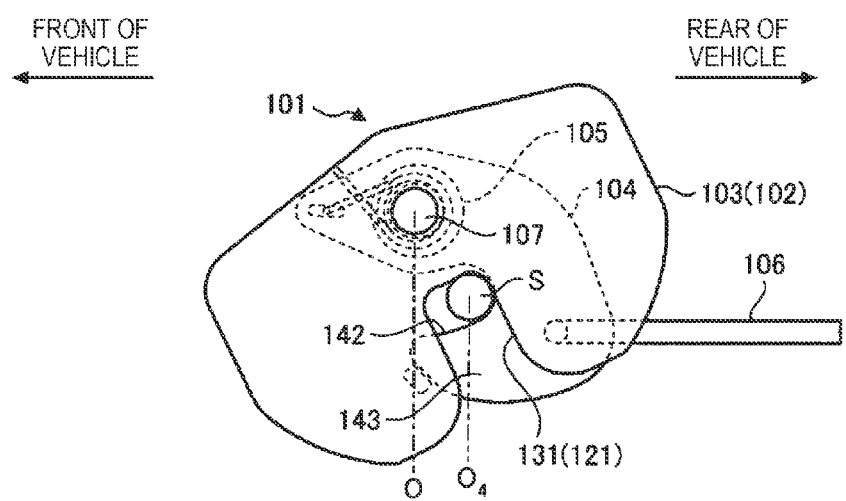
Figures 4, 15:
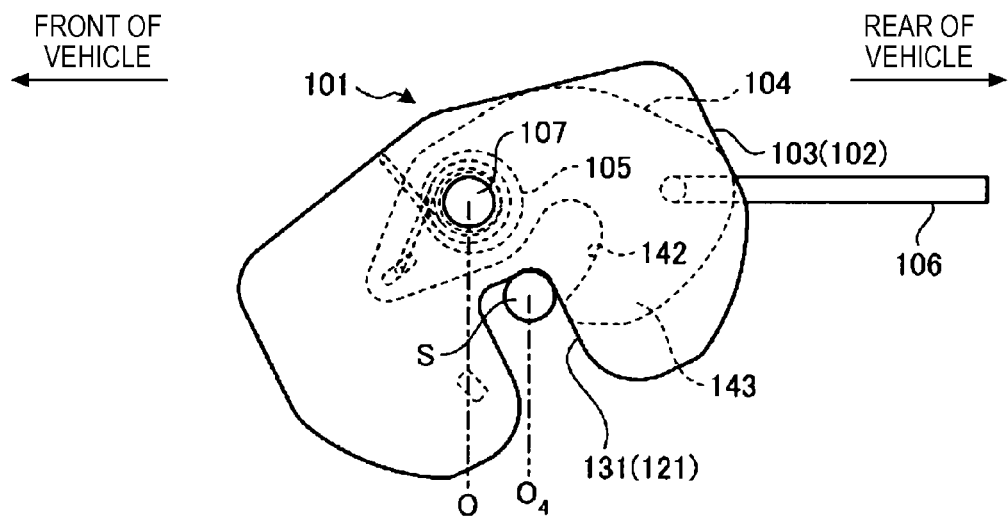

On the other hand, as shown in FIG. 15, even with the striker S mounted in a rear position $O_4$ which lies further rearwards than the reference position O, by rotationally moving the base plate 102 and the cover plate 103 counterclockwise as seen in FIG. 14, the striker S is allowed not only to enter the entrance grooves 121, 131 to the deepest portions thereof but also to be brought into abutment with the inner wall of the engagement groove 142.

To describe this specifically, when the seat (not shown) is not yet fastened to the floor (not shown), as shown in FIG. 15-1, the latch 104 is disposed in the initial position. When the seat is inclined from that state, the striker S which is provided on the floor is brought into abutment with the outer circumference of the hook portion 143 to press against the outer circumference of the hook portion 143. This rotationally moves the latch 104 counterclockwise as seen in FIG. 15 against the elastic restoring force of the latch spring 105. Thereafter, the striker S presses against the inner walls of the entrance grooves 121, 131 of the base plate 102 and the cover plate 103. Then, the base plate 102 and the cover plate 103 rotationally more counter counterclockwise in FIG. 15. Then, the latch 104 rotationally moves to a position which enables the striker S to enter the entrance grooves 121, 131.

When the seat is inclined further from the state described above, the striker S enters the entrance grooves 121, 131, while the elastic restoring force of the hook spring 105 is applied to the latch 104, whereby the latch 104 rotationally moves clockwise as seen in FIG. 15. Then, the striker S rotationally moves the base plate 102 and the cover plate 103 clockwise along the entrance grooves 121, 131 and reaches the deepest portions of the entrance grooves 121, 131. In this state, the base plate 102 and the cover plate 103 are inclined so that their front ends which face the front of the vehicle are raised and the striker S is brought into abutment with the inner wall of the engagement groove 142. Moreover, as shown in FIG. 15-3, since the hook portion 143 of the latch 104 is disposed so as to cross the entrance grooves 121, 131, a situation in which the striker S moves in a direction in which the striker S is disengaged from the entrance grooves 121, 131, that is, an erecting operation of the seat relative to the floor is prevented by the hook portion 143 (an engagement state).

Further, when the rod 106 is pulled from the engagement state described above against the elastic restoring force of the hook spring 105, the latch 104 rotationally moves counterclockwise as seen in FIG. 15. As a result of this, as shown in FIG. 15-4, the entrance grooves 121, 131 are opened, which enables the striker S to move in a direction in which the striker S is disengaged from the entrance grooves 121, 131, whereby the seat can be operated to be erected relative to the floor.

In the latch apparatus 101 which configures Embodiment 3 of the invention described above, as shown in FIG. 12, the deepest portions of the entrance grooves 121, 131 are formed into the ark-like shape which is centered at the latch shaft 122 and which has the radius "r" and the engagement groove 142 is formed into the arc-like shape which extends inwards from the outer circumferential surface of the latch 104 so as to be centered at the shaft hole 141 and which has the radius R. Because of this, not only in the case of the latch apparatus 101 rotationally moving but also in the case of the latch 104 rotationally moving relative to the latch apparatus 101, since the deepest portions of the entrance grooves 121, 131 keep the arc-like shape having the radius "r" without any change and the engagement groove 142 keeps the arc-like shape having the radius R without any change, the striker S can enter the entrance grooves 121, 131 with the latch apparatus 101 inclined more than the latch apparatus 1 of Embodiment 1 so as to be brought into engagement with the latch 104. By adopting this configuration, in the latch apparatus 101 of this embodiment, the inclination of the latch apparatus 101 can be increased by extending the arcs of the radius "r" at the deepest portions of the entrance grooves 121, 131, and therefore, the latch apparatus 101 of this embodiment can be brought into engagement with the striker S which is situated further forwards or rearwards than that of the latch apparatus 1 of Embodiment 1.

In addition, the deepest portions of the entrance grooves 121, 131 are formed into the ark-like shape which is centered at the latch shaft 122 and which has the radius "r", and the engagement groove 142 is formed into the arc-like shape which is centered at the shaft hole 141 and which has the radius R. Therefore, the deepest portions of the entrance grooves 121, 131 and an inner circumferential surface of the engagement groove 142 form circles which are concentric with each other. By adopting this configuration, the striker S is brought into contact with the latch apparatus 101 at the two points of the deepest portions of the entrance grooves 121, 131 and the inner circumferential surface of the engagement groove 142.

In addition, as shown in FIG. 14, even with the striker S mounted in the front position $O_3$ which lies further forwards than the reference position O, by the base plate 102 and the cover plate 103 being inclined, the latch 104 receives the striker S therein, whereby the latch 104 and the striker S are brought into engagement with each other. Additionally, as shown in FIG. 14-3, although the deepest portions of the entrance grooves 121, 131 and the engagement groove 142 form the concentric circles which are centered at the latch shaft 122, the latch apparatus 101 which is mounted on the seat rotates about a hinge of the seat which is provided in a position which differs from the latch shaft 122, and therefore, no force is exerted in a tangential direction of the concentric circles. Therefore, there occurs no such situation that the latch 104 and the striker S move in the longitudinal direction of the vehicle (a lateral direction in FIG. 14) in such a state that the latch 104 and the striker S are kept in engagement with each other. This prevents the rotational movement of the latch 104, and hence, no rattling looseness is generated between the latch apparatus 101 and the striker S. Further, since the latch shaft 122 is provided in the position lying above the entrance grooves 121, 131, when the base plate 102 and the cover plate 103 are rotationally moved clockwise as seen in FIG. 14, the orientation of the entrance grooves 121, 131 can be changed so as to receive the striker S therein from an initial stage of their rotational movements. Therefore, with the widths of the entrance grooves 121, 131 set narrow, the engagement state can be realized, thereby making it possible to make the latch apparatus 1 small in size.

Similarly, as shown in FIG. 15, even with the striker S mounted in the rear position $O_4$ which lies further rearwards than the reference position, by the base plate 102 and the cover plate 103 being inclined, the latch 104 receives the striker S therein, whereby the latch 104 and the striker S are brought into engagement with each other. Additionally, as shown in FIG. 15-3, although the deepest portions of the entrance grooves 121, 131 and the engagement groove 142 form the concentric circles which are centered at the latch shaft 122, the latch apparatus 101 which is mounted on the seat rotates about the hinge of the seat which is provided in the position which differs from the latch shaft 122, and therefore, no force is exerted in the tangential direction of the concentric circles. Therefore, there occurs no such situation that the latch 104 and the striker S move in the longitudinal direction of the vehicle (a lateral direction in FIG. 15) in such a state that the latch 104 and the striker S are kept in engagement with each other. This prevents the rotational movement of the latch 104, and hence, no rattling looseness is generated between the latch apparatus 101 and the striker S.

Embodiment 4

Figure 16:
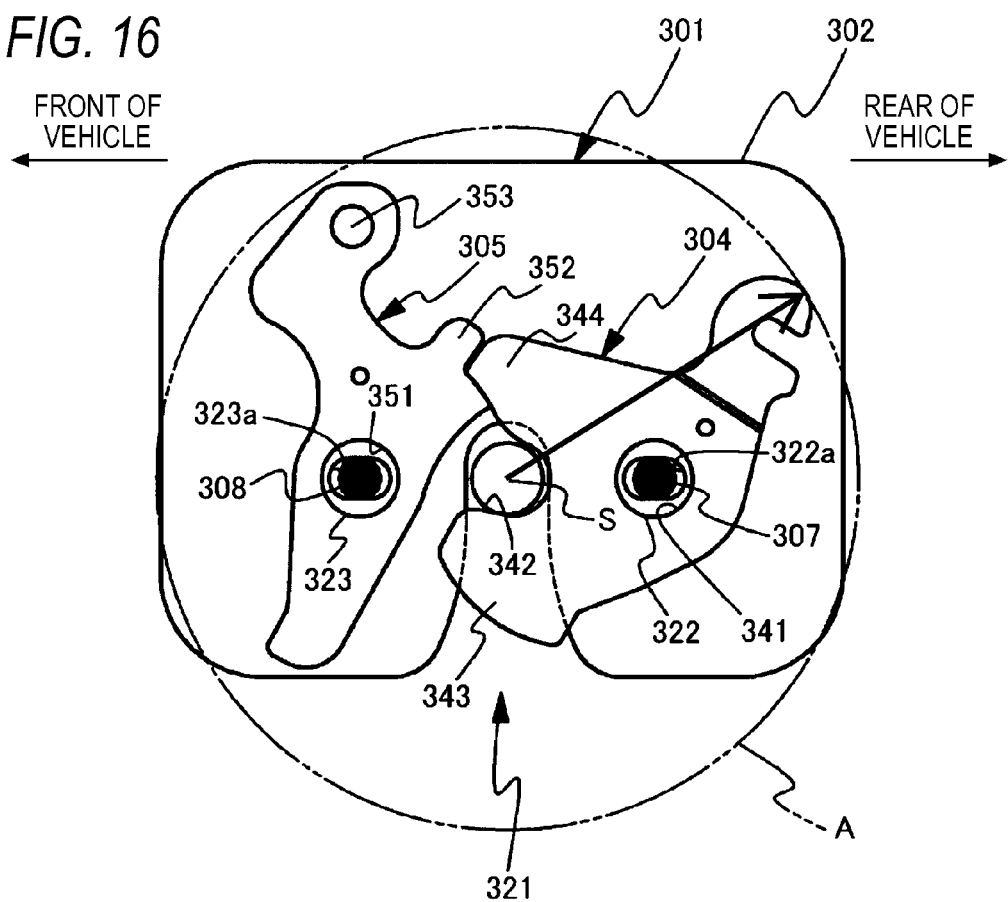
FIG. 16 is a conceptual drawing which shows the configuration of a latch apparatus which configures Embodiment 4 of the invention.

FIG. 16 is a conceptual drawing which shows the configuration of a latch apparatus which configures Embodiment 4 of the invention.

A latch apparatus 301 which is described as an example here can move in a longitudinal direction of a vehicle main body relative to a striker S and includes a base plate 302 and a cover plate (not shown) which is mounted on the base plate 302 so as to be superposed thereon. Additionally, a latch mechanism accommodating portion is defined between the base plate 302 and the cover plate, so that a latch 304 and a ratchet 305 which meshes with the latch 304 are accommodated in an interior thereof. As with those described in Embodiments 1 to 3, the latch 304 is designed to be brought into engagement with the striker S which is provided on a floor surface.

Additionally, an entrance groove 321 is formed in the base plate 302 and the cover plate in a substantially longitudinal central position thereof as seen in a front-to-rear or longitudinal direction of the vehicle so as to extend substantially vertically from a floor side towards a ceiling side. The entrance groove 321 is formed to have a width which enables the accommodation of the striker S described above therein. In addition, a cylindrical latch shaft 322 is provided in a position lying at the rear of the entrance groove 321 so as to extend substantially horizontally along a widthwise direction of the vehicle. The latch 304 is fitted on the latch shaft 322 so as to rotationally move therearound.

A shaft hole 341 is formed in the latch 304 in the center thereof for the latch shaft 322 to fit therein, and an engagement groove 342, a hook portion 343, and a locking portion 344 are formed along an outer circumference of the shaft hole 341.

The engagement groove 342 is formed so as to extend from an outer circumferential surface of the latch 304 towards the shaft hole 341 and is given a width which enables the accommodation of the striker S therein.

Figures 1, 17:
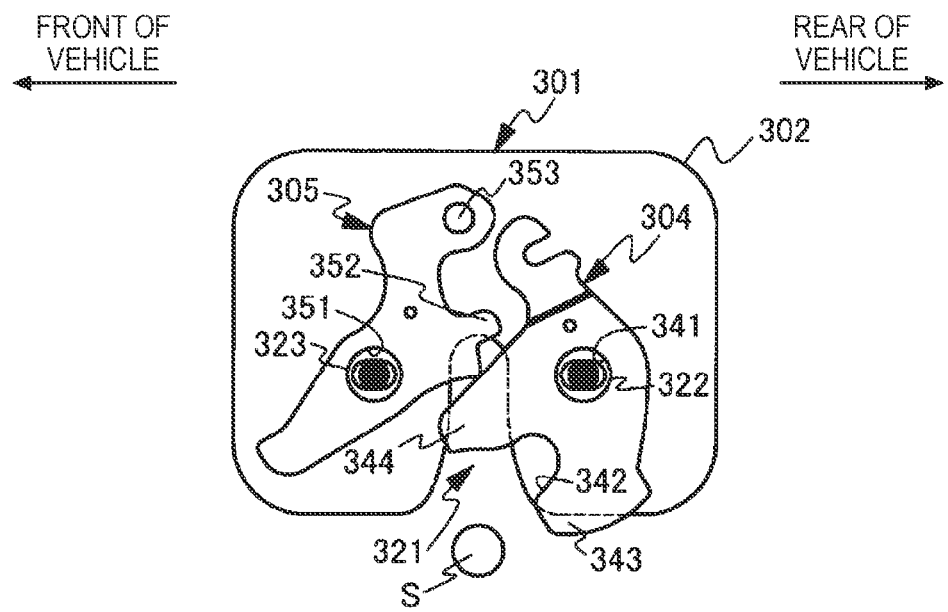
Figures 2, 17:
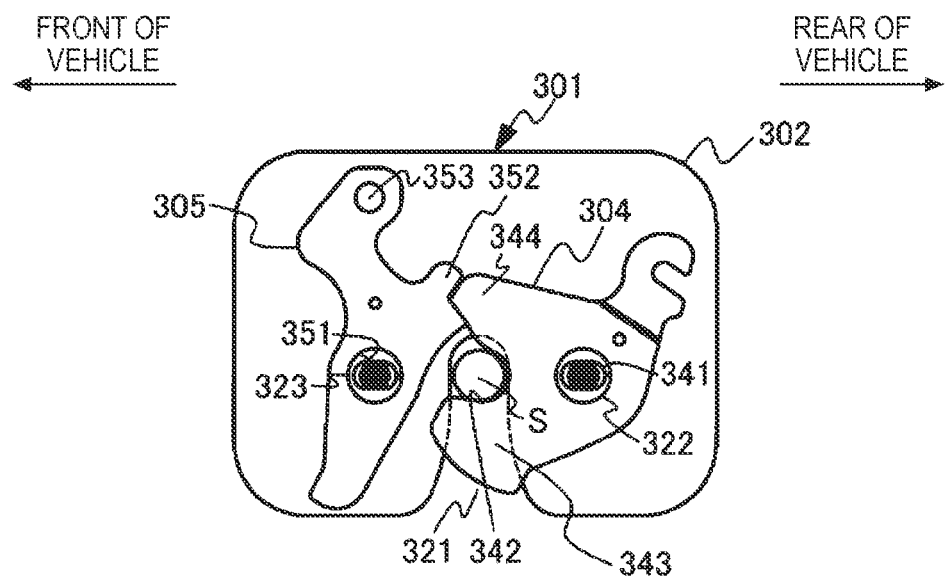
Figures 3, 17:
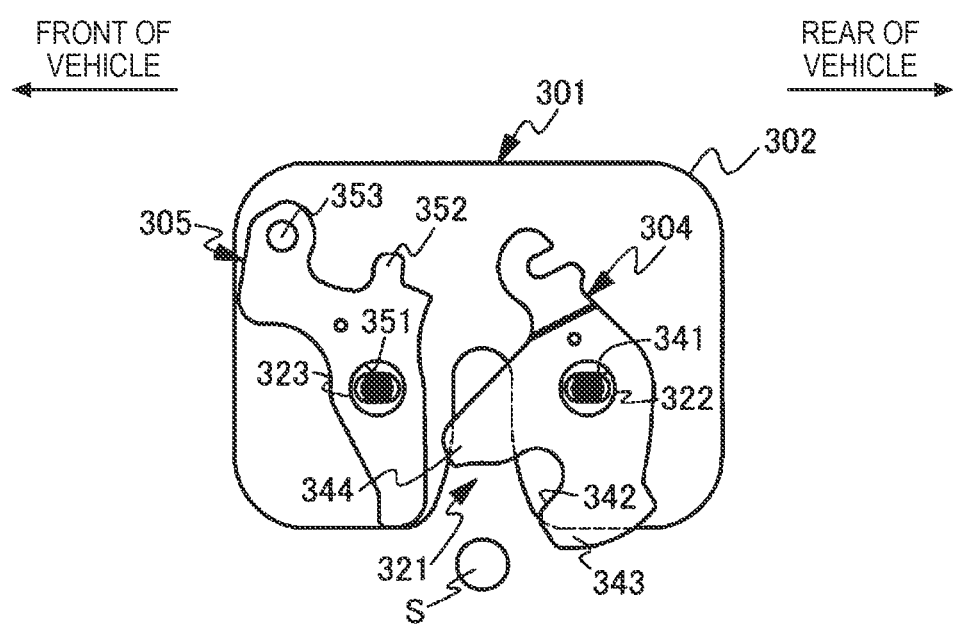

With the engagement groove 342 opened towards a side which faces a front of the vehicle, the hook portion 343 is a portion which is positioned below the engagement groove 342. This hook portion 343 is formed so that when the latch 304 is rotationally moved clockwise as seen in FIG. 17, the hook portion 343 stops in a position where the hook portion 343 crosses the entrance groove 321 (an engagement position) as shown in FIGS. 17-2, while when the latch 304 is rotationally moved counterclockwise as seen in FIG. 17, the hook portion 343 stops in a position where the hook portion 343 opens the entrance groove 321 (an opening position) as shown in FIGS. 17-1 and 17-3.

With the engagement groove 342 opened obliquely downwards, the locking portion 344 is a portion which is positioned closer to the ceiling side than the engagement groove 342. This locking portion is configured so that when the latch 304 is rotated clockwise as seen in FIG. 17, the locking portion stops in a position where the locking portion 344 crosses the entrance groove 321 as shown in FIG. 17-1. Although not shown in the figures, a hook spring which applies a counterclockwise elastic restoring force to the latch 304 at all times in FIG. 17 is provided between the latch 304 and the base plate 302.

Additionally, a cylindrical ratchet shaft 323 which extends substantially horizontally along a widthwise direction of the vehicle is provided in a position which lies in front of the entrance groove 321 and which is substantially at the same height as the latch shaft 322 described above. The ratchet 305 is fitted on the ratchet shaft 323 so as to move rotationally.

The ratchet 305 has a shaft hole 351 which is formed in the center thereof for the ratchet shaft 323 to fit therein. The ratchet 305 has a meshing portion 352 and a portion of application 353 on an outer circumference thereof. The meshing portion 352 is a portion which extends diametrically outwards from the shaft hole 351 towards the rear of the vehicle. When the ratchet 305 moves rotationally clockwise as seen in FIG. 17, the meshing portion 352 can mesh with the locking portion 344 of the latch 304 described above via a projecting end face thereof.

The portion of application 353 is a portion which extends diametrically outwards from the shaft hole 351 towards the ceiling side. Additionally, although not shown clearly in the figures, a ratchet spring which applies a clockwise elastic restoring force to the ratchet 305 at all times as seen in FIG. 17 is provided between the ratchet 305 and the base plate 302.

In the latch apparatus 301 which is configured as has been described above, when the seat (not shown) is not yet fixed to the floor (not shown), the latch 304 is disposed in an opening position as shown in FIG. 17-1. When the seat is inclined from this state, the striker S which is provided on the floor enters the entrance groove 321 and is then brought into abutment with the locking portion 344 of the latch 304. As a result of this, the latch 304 rotates clockwise as seen in FIG. 17 against the elastic restoring force of the hook spring. During the rotation of the latch 304, in the ratchet 305, the projecting end face of the meshing portion 352 is brought into sliding contact with an outer circumferential surface of the latch 304 by the elastic restoring force of the ratchet spring, whereby the ratchet 305 rotates about an axis of the latch shaft 322 as required according to an outer circumferential shape of the latch 304.

When the seat is inclined further from the state described above, since the entrance of the striker S into the entrance groove 321 increases gradually, the latch 304 rotates clockwise further, and as shown in FIG. 17-2, the meshing portion 352 of the ratchet 305 then reaches the engagement groove 342 of the latch 304. In this state, since the locking portion 344 of the latch 304 is brought into abutment with the meshing portion 352 of the ratchet 305, the counterclockwise rotation of the latch 304 is prevented against the elastic restoring force of the hook spring. Moreover, since the hook portion 342 of the latch 304 is disposed so as to cross the entrance groove 321, a movement of the striker S in a direction in which the striker S is disengaged from the entrance groove 321, that is, an erecting operation of the seat relative to the floor is prevented by the hook portion 343 (an engagement state).

When the portion of application 353 of the ratchet 305 is rotationally moved further counterclockwise from the engagement state described above against the elastic restoring force of the ratchet spring, the meshing engagement of the locking portion 344 of the latch 304 with the meshing portion 352 of the ratchet 305 is released, whereby the latch 304 rotationally moves counterclockwise as seen in FIG. 17 by means of the elastic restoring force of the hook spring. As a result of this, as shown in FIG. 17-3, the entrance groove 321 is opened, and this enables not only the striker S to move in a direction in which the striker S is disengaged from the entrance groove 321 but also the seat to be operated to be erected from the floor.

The latch apparatus 301 described above includes a fastening member 307 which fastens the base plate 302 so as to move relative to the striker S within a range defined by projecting an area A onto the base plate 302, as shown in FIG. 16. The area A has a radius centering at the striker S which is in engagement with the latch 304, and the radius is equal to a length to an outermost position of the latch 304 which is in engagement with the striker S.

The fastening member 307 is a stepped screw having a shank portion and is inserted through an elongated hole 322a formed in a bottom wall of the cylindrical latch shaft 322 to thereby fasten the base plate 302. By adopting this configuration, compared with a construction in which the fastening member 307 does not penetrate the latch shaft 322, the latch apparatus 301 can be made smaller in size.

Additionally, an elongated hole 323a is formed in a bottom wall of the cylindrical ratchet shaft 323, and a second fastening member 308 is inserted through this elongated hole 323a to thereby fasten the base plate 302. By adopting this configuration, compared with a construction in which the second fastening member 308 does not penetrate the ratchet shaft 323, the latch apparatus 301 can be made smaller in size.

The latch apparatus 301 which is fastened by the fastening member 307 and the second fastening member 308 is allowed to move relatively in the longitudinal direction of the vehicle. Even with the striker S mounted in a front position which lies further forwards than a reference position, the latch apparatus 301 moves to the front as the striker S enters the entrance groove 321, and therefore, the striker S enters the entrance groove 321 so that the striker S is brought into engagement with the latch 304.

Similarly, with the striker S mounted in a rear position which lies further rearwards than the reference position, the latch apparatus 301 moves to the rear as the striker S enters the entrance groove 321, and therefore, the striker S enters the entrance groove 321 so that the striker S is brought into engagement with the latch 304.

The latch apparatus 301 which configures Embodiment 4 of the invention described above includes the fastening member 307 which fastens the base plate 302 so as to move in the longitudinal direction of the vehicle main body relative to the striker S within the range defined by projecting the area A onto the base plate 302. The area A has a radius centering at the striker S which is in engagement with the latch 304, and the radius is equal to the length to the outermost position of the latch 304 which is in engagement with the striker S. Therefore, the latch apparatus 301 is made small in size as a whole, and even though a large force is applied to the latch 304, there occurs no such situation that the base plate 302 is turned up. In addition, even with the width of the entrance groove 321 set narrow, the latch apparatus 301 is allowed to move relatively in the longitudinal direction of the vehicle by the elongated holes 322a, 323a and the fastening members 307, 308, whereby the striker S is allowed to enter the entrance groove 321 to thereby be brought into engagement with the latch 304, thereby making it possible to make the latch apparatus 301 small in size. Additionally, while the second fastening member 308 is described as being inserted through the elongated hole 323a formed in the bottom wall of the ratchet shaft 323, the invention is not limited thereto. Any configuration may be adopted as long as the latch apparatus 301 is allowed to move relatively in the longitudinal direction.

Thus, as has been described heretofore, the following matters are disclosed in this specification.

(1) A latch apparatus comprising: a case which is mounted on a mount member and in which an entrance groove which a striker enters is formed; and a latch, which is accommodated in the case so as to be rotationally movable, and which is configured to be brought into engagement with the striker which enters the entrance groove, wherein the latch apparatus comprises a fastening member configured to fasten the case to the mount member such that the case is moveable relative to the striker within a range defined by projecting an area, which has a radius centering at the striker being in engagement with the latch, onto the case, the radius being equal to a length to an outermost position of the latch being in engagement with the striker.

(2) The latch apparatus according to (1), wherein the case is rotationally moveable around the fastening member.

(3) The latch apparatus according to (2), wherein the fastening member is inserted through a rotation center of the latch.

(4) The latch apparatus according to (2) or (3), comprising: a second fastening member which is inserted through an elongated hole that is formed into an arc-like shape centering at the fastening member.

(5) The latch apparatus according to (2) or (3), comprising: a posture maintaining portion configured to maintain a posture of the case around the fastening member.

(6) The latch apparatus according to (5), wherein the posture maintaining portion comprises a sliding portion configured to generate sliding resistance between the case and the fastening member.

(7) The latch apparatus according to (6), wherein the sliding portion is a rib which is provided on an inner circumference of a hole in the case through which the fastening member is inserted.

(8) The latch apparatus according to (6), wherein the sliding portion is a rib which is provided on an edge portion of an opening in a hole in the case through which the fastening member is inserted.

(9) The latch apparatus according to (4), comprising: a posture maintaining portion configured to maintain a posture of the case around the fastening member.

(10) The latch apparatus according to (9), wherein the posture maintaining portion comprises a sliding portion configured to generate sliding resistance between the case and the fastening member.

(11) The latch apparatus according to (10), wherein the posture maintaining portion comprises a second sliding portion configured to generate sliding resistance between the case and the second fastening member.

(12) The latch apparatus according to (11), wherein the second sliding portion is a rib which is provided on an inner circumference of an elongated hole in the case through which the second fastening member is inserted.

(13) The latch apparatus according to any one of (1) to (12), wherein the latch comprises an engagement groove which has an arc shape centering at a rotation center thereof.

(14) The latch apparatus according to (13), wherein the engagement groove is formed into a tapered shape which is gradually narrowed from an entrance of an opening towards a deep portion thereof.

(15) The latch apparatus according to any one of (1) to (14), wherein the entrance groove has a shape which is gradually narrowed as the entrance groove extends deep so as to be brought into contact with the entered striker at two points.

INDUSTRIAL APPLICABILITY

The invention can be used to fix the detachable seat or the movable seat of the vehicle to the floor surface.

While the invention has been described in detail or by the specific embodiments, it is obvious to those skilled in the art to which the invention pertains that various alterations or modifications can be made thereto without departing from the spirit and scope of the invention. This patent application is based on Japanese Patent Application (No. 2011-173385) filed on Aug. 8, 2011, the contents of which are incorporated herein by reference.

DESCRIPTION OF REFERENCE NUMERALS AND SIGNS 1 latch apparatus
2 base plate
21 entrance groove
22 latch shaft
22a surface of inner wall
22a1 rib
23 elongated hole
23a inner circumference
23a1 rib
3 cover plate
31 entrance groove
33 elongated hole
4 latch
41 shaft hole
42 engagement groove
43 hook portion
44 spring attaching portion
45 rod attaching portion
5 latch spring
6 rod
7 fastening member
8 second fastening member
101 latch apparatus
102 base plate
121 entrance groove
122 latch shaft
103 cover plate
131 entrance groove
104 latch
141 shaft hole
142 engagement groove
143 hook portion
144 spring attaching portion
145 rod attaching portion
105 latch spring
106 rod
107 fastening member
301 latch apparatus
302 base plate
321 entrance groove
322 latch shaft
322a elongated hole
323 ratchet shaft
323a elongated hole
304 latch
341 shaft hole
342 engagement groove
343 hook portion
344 locking portion
305 ratchet
351 shaft hole
352 meshing portion
353 portion of application
307 fastening member
308 second fastening member
S striker
A rotational movement locus of latch
F load to be borne
O reference position
$O_1$ front position
$O_2$ rear position
$O_3$ front position
$O_4$ rear position

The invention claimed is:

1. A latch apparatus comprising:
a case which is mounted on a mount member and in which an entrance groove which a striker enters is formed; and
a latch, which is accommodated in the case so as to be rotationally movable, and which is configured to be brought into engagement with the striker which enters the entrance groove,
wherein the latch apparatus comprises a fastening member configured to fasten the case to the mount member such that the case is moveable relative to the striker, the fastening member being provided within a range defined by projecting an area on the case, the area having a radius centering at the striker being in engagement with the latch and extending to an outermost position of the latch being in engagement with the striker.

2. The latch apparatus according to claim 1, further comprising:
a ratchet, which meshes with the latch, the ratchet comprising a shaft hole for a ratchet shaft to fit therein; and
a second fastening member, which is inserted through the ratchet shaft, wherein the second fastening member is provided within the range.

3. A latch apparatus comprising:
a case which is mounted on a mount member and in which an entrance groove which a striker enters is formed;
a latch, which is accommodated in the case so as to be rotationally movable, and which is configured to be brought into engagement with the striker which enters the entrance groove; and
a fastening member configured to fasten the case to the mount member such that the case is moveable relative to the striker, the fastening member being provided within a range defined by projecting an area on the case, the area having a radius centering at the striker being in engagement with the latch and extending to an outermost position of the latch being in engagement with the striker;
wherein the case is rotationally moveable around the fastening member; and
wherein the fastening member is inserted through a rotation center of the latch.

4. The latch apparatus according to claim 3, comprising:
a second fastening member which is inserted through an elongated hole that is formed into an arc shape centering at the fastening member.

5. The latch apparatus according to claim 4, comprising:
a posture maintaining portion configured to maintain a posture of the case around the fastening member.

6. The latch apparatus according to claim 5, wherein the posture maintaining portion comprises a sliding portion configured to generate sliding resistance between the case and the fastening member.

7. The latch apparatus according to claim 6, wherein the posture maintaining portion comprises a second sliding portion configured to generate sliding resistance between the case and the second fastening member.

8. The latch apparatus according to claim 7, wherein the second sliding portion is a rib which is provided on an inner circumference of an elongated hole in the case through which the second fastening member is inserted.

9. The latch apparatus according to claim 3, comprising:
a posture maintaining portion configured to maintain a posture of the case around the fastening member.

10. The latch apparatus according to claim 9, wherein the posture maintaining portion comprises a sliding portion configured to generate sliding resistance between the case and the fastening member.

11. The latch apparatus according to claim 10, wherein the sliding portion is a rib which is provided on an inner circumference of a hole in the case through which the fastening member is inserted.

12. The latch apparatus according to claim 10, wherein the sliding portion is a rib which is provided on an edge portion of an opening in a hole in the case through which the fastening member is inserted.

13. The latch apparatus according to claim 3, wherein the latch comprises an engagement groove which has an arc shape centering at a rotation center thereof.

14. The latch apparatus according to claim 13, wherein the engagement groove is formed into a tapered shape which is gradually narrowed from an entrance of an opening towards a deep portion thereof.

15. The latch apparatus according to claim 3, wherein the entrance groove has a shape which is gradually narrowed as the entrance groove extends deep so as to be brought into contact with the entered striker at two points.

* * * * *